US012414894B2

(12) United States Patent
Marquez de la Vega et al.

(10) Patent No.: US 12,414,894 B2
(45) Date of Patent: Sep. 16, 2025

(54) THERAPEUTIC TREATMENT KIT

(71) Applicants: Francisco Marquez de la Vega, Madrid (ES); Marta Martinez Garcia, Madrid (ES)

(72) Inventors: Francisco Marquez de la Vega, Madrid (ES); Marta Martinez Garcia, Madrid (ES)

( * ) Notice: Subject to any disclaimer, the term of this patent is extended or adjusted under 35 U.S.C. 154(b) by 9 days.

(21) Appl. No.: 17/270,717

(22) PCT Filed: Aug. 23, 2019

(86) PCT No.: PCT/ES2019/070573

§ 371 (c)(1),
(2) Date: Oct. 4, 2021

(87) PCT Pub. No.: WO2020/039112

PCT Pub. Date: Feb. 27, 2020

(65) Prior Publication Data

US 2025/0195310 A1 Jun. 19, 2025

(30) Foreign Application Priority Data

Aug. 23, 2018 (ES) .................................. 201830835

(51) Int. Cl.
*A61H 1/02* (2006.01)

(52) U.S. Cl.
CPC ... *A61H 1/0229* (2013.01); *A61H 2201/0192* (2013.01); *A61H 2201/1652* (2013.01); *A61H 2201/1697* (2013.01)

(58) Field of Classification Search
CPC ........ A61H 3/008; A61H 1/0218–0229; A61B 5/1116–112
See application file for complete search history.

(56) References Cited

U.S. PATENT DOCUMENTS 2,546,688 A 3/1951 Cullen
2,907,324 A 10/1959 Catanzaro
(Continued)

FOREIGN PATENT DOCUMENTS

EP 2 311 424 A1 4/2011
KR 10-2018-0042820 4/2018
(Continued)

OTHER PUBLICATIONS

Search Report from Spanish Patent and Trademark Office, App. No. 201830835 dated Feb. 8, 2019.
Marpe Co. Ltd. / Manual Therapy Using MTS; YouTube Video (Printout) Retrieved from URL: https://www.youtube.com/watch?v=X5BmCj8y3mM, dated Jul. 26, 2016.
(Continued)

*Primary Examiner* — Joseph D. Boecker
*Assistant Examiner* — Thomas W Greig
(74) *Attorney, Agent, or Firm* — Lippes Mathias LLP

(57) ABSTRACT

The invention relates to a kit (100) for therapeutic treatment of a patient, configurable according to the said patient's therapeutic treatment requirements, which comprises a box (10) joined by an articulated or fixed connection to a support structure (40) and comprising one or more pairs of pulleys (60) over which one or more length-adjustable cords (50) of the box run and a sliding structure (110) connected to a support structure (40) enabling the box (10) to be moved to a position selected for the therapeutic treatment of the said patient, preferably by means of a pair of rails or guides (20), with one or more supports (70) also having been envisaged, provided with means of connection to the cords (50) and which are configured to hold in place one or more parts of the patient's body, raising or placing the said part or parts in certain positions for therapeutic treatment.

11 Claims, 29 Drawing Sheets

(56) References Cited

U.S. PATENT DOCUMENTS

| | | | | | |
|---|---|---|---|---|---|
| 5,626,540 | A * | 5/1997 | Hall | A61H 1/0229 606/241 |
| 9,272,223 | B2 * | 3/2016 | Checketts | A63G 21/22 |
| 9,662,539 | B2 * | 5/2017 | Rakhmatullin | A63B 21/00181 |
| 10,799,409 | B2 * | 10/2020 | Rydstrom | A61G 7/1051 |
| 11,759,384 | B2 * | 9/2023 | Mitschke | A61H 3/008 482/69 |
| 11,925,596 | B2 * | 3/2024 | Belforte | A61H 3/008 |
| 2007/0232449 | A1 | 10/2007 | Planke | |
| 2010/0113232 | A1 * | 5/2010 | Chen | A61H 1/0229 482/133 |
| 2010/0144504 | A1 * | 6/2010 | Krell | A61H 1/0229 482/143 |
| 2013/0116604 | A1 | 5/2013 | Morilla et al. | |
| 2019/0083351 | A1 * | 3/2019 | Suzuki | A61H 3/008 |

FOREIGN PATENT DOCUMENTS

| | | | |
|---|---|---|---|
| WO | WO 99/60979 | | 12/1999 |
| WO | WO 2004/020045 | A1 | 3/2004 |
| WO | WO 2006/057562 | A1 | 6/2006 |
| WO | WO 2008/054222 | A1 | 5/2008 |

OTHER PUBLICATIONS

PCT/ES2019/070573 International Search Report and Written Opinion, issued Dec. 12, 2019.

PCT/ES2019/070573 International Preliminary Report on Patentability, issued Nov. 5, 2020.

Manual Therapy using MTS. Jul. 26, 2016 [on line] [ retrieved Aug. 2, 2019]. Retrieved from Internet URL:https:/youtube.com/watch?v=X5BmCj8y3mM.

* cited by examiner

THERAPEUTIC TREATMENT KIT

FIELD OF THE INVENTION

The object of this invention is a kit for therapeutic treatment of patients with muscular, joint or skeletal injuries: the kit to which the invention relates is for use by rehabilitation doctors, physiotherapists and medical professionals in general who treat such patients.

BACKGROUND OF THE INVENTION

Various kits for therapeutic treatment of patients with different types of muscular, joint and skeletal injuries are known in the prior art. Those most commonly used are systems comprising several slings by means of which the patient is suspended and placed in a certain position, subsequently being moved in a specific way so as to treat their injuries. The state of the art thus comprises devices for use by therapists enabling a part of the patient's body to be secured in an elevated position: the so-called "sling bars" that are typically suspended from the ceiling and from which a series of ropes are also suspended to secure the patient in question. These sling bars are of the individual type, comprising only two cords, and it is therefore necessary to use several sling bar units to correctly position the patient, these devices being very complex to fit in place and to operate.

Devices of this type for either training patients or providing therapeutic treatment for their injuries are comprised in the state of the art, such as those described in the US patent documents 2007/0232449 A1, WO 2006/057562 A1, WO 2004/020045 A1 or WO 2008/054222 A1.

Document US2013116604 discloses a device for patients (people or animals) requiring treatment and/or rehabilitation, which consists of two parallel fixed rails enabling the forward/backward movement of a second pair of parallel rails, arranged transversally with regard to the first rails, allowing the free movement from left to right or vice versa of a structure mounted on this second set of rails. This basic structure is comprised of an electric motor worked by a remote control and from the end of which a cable is suspended, to which a harness is fixed in accordance with the characteristics of the person or animal undergoing treatment. In short, the device is designed to lift and move people or animals with motor ability. By means of two pairs of perpendicularly arranged rails, the patient can move in the directions of the X and Y axes. The patient is lifted along the Z-axis on being fitted with a harness which is in turn hung from a hook on a motor-driven pulley. This device enables a patient to be lifted and remain suspended from a harness and then moved horizontally along an X-axis and Y-axis, being basically a small crane. However, this device has major limitations, including the following:

- It does not allow selective lifting of only one part of the patient's body for purposes of therapeutic treatment, as the whole body is suspended from a single hook that holds a single harness. The ultimate aim of this device is to move the patient, rather than for a physiotherapist to provide treatment.
- It does not allow the patient (or any part of their body) to be turned or rotated on a horizontal axis for therapeutic treatment (this being impossible as the whole body is suspended from a single cord worked by the electric pulley).
- Electrical means are required in order to lift the patient and move the device (a single pulley is envisaged, worked by one motor for lifting and another motor for working the wheels for the horizontal displacement).

As to the document EP2311424, it discloses a pulley table type device for carrying out physiotherapy and patient rehabilitation work. The device consists of two mutually parallel long bars and at least two longitudinal bars arranged on the said bars, being positionable on them, and at least one longitudinal bar attached to the longitudinal bars and on which there are, at least indirectly, devices for hanging handgrips and straps, and devices for supporting and securing the parts of a patient's body. The device also consists of a number of sliding elements that are attached to the cross bars in order to house the corresponding slings, loops or pulleys. A variable number of these sliding elements are positioned on the corresponding cross bars and can be displaced longitudinally, there being a hole in them for this purpose. This device has major limitations, including the following:

- Although the device works by means of a suspension system, it does not allow three-way mobility, as it only allows for working on the one-way horizontal plane.
- The device is configured on the basis of a complex, unstable structure involving a large number of rounded bars on which a number of different sliding elements are in turn placed. It is therefore a kit comprised of a very large number of individual parts, making it complex and tedious to work with.
- It works with fixed, closed pulleys external to the structure. It does not make use of the pulley function as such, using the pulleys merely as hooks.
- The cords are used as fixing elements and not as independent mobile elements. It is therefore impossible to treat a particular part or limb of the patient's body.

Also, the devices known in the prior art do not allow the patient to be moved very much, with only very limited movements being possible; as a result, making adaptations to these devices in order to vary the movements provided originates final movements with tension and resistance for both the patient and the therapist handling them. It is therefore desirable to provide a system that will enable rhythmic movements, without tension, harmonious and functional. It is also desirable for the system to allow the therapist to work from a better position for treatment on a stretcher, so that it not only benefits the patient but also frees the therapist from pressure, tension and bad posture during their work.

Consequently, one of the main objects of the invention is to provide a kit or system enabling the patient to be in a position during treatment which will make it possible for them to be moved, allowing therapeutic treatment techniques to be used at any of the three customary levels:

- Treatment of joint components or joint stability;
- Treatment of muscle components or muscle stability;
- Musculoskeletal compensation systems: imbalance patterns, postural directions, static/dynamic position or functional musculoskeletal reorganisation, etc.

It is therefore essential for the system to which the invention relates to allow work on three axes of movement, so that the patient can move in any direction during the treatment, which is not possible with the currently known techniques. Also, the system to which the invention relates allows the professional or therapist to work comfortably without tension or bad posture, moving the patient in accordance with the therapy they require.

The object of this invention is to provide the aforementioned objectives and avoid the disadvantages of the treatment systems already known in the prior art, as will subsequently be described in detail.

SUMMARY OF THE INVENTION

In accordance with a first aspect, the invention relates to a kit for therapeutic treatment of a patient, configurable according to the said patient's therapeutic treatment requirements, comprising a box arranged on a support structure that is able to move across a sliding structure until it is correctly positioned to enable the said patient's treatment, the box comprising one or more cords whose length can be adjusted so that they can be joined to one or more supports configured to support one or more parts of the patient's body, lifting or placing the said part or parts in certain positions, which will remain stable throughout the therapeutic treatment.

Preferably, the kit to which the Invention relates also comprises one or more retaining elements whose purpose is to maintain the cords of the box fixed at a certain length.

Typically, the kit for therapeutic treatment of a patient to which the invention relates also comprises one or more pairs of pulleys, over which the cords of the box slide, thus enabling their length to be adjusted.

In the kit to which the invention relates, the cord or cords are preferably associated with different pulleys, so that they can be moved and/or adjusted separately. In a preferred embodiment, the kit to which the invention relates also comprises at least one modulating element comprising a short cord and two retaining elements, this structure enabling several of the cords of the box to be connected so that they work together in a coordinated fashion.

In the kit to which the invention relates, the underside of the box is preferably provided with a number of conveniently distributed holes, through which the cord or cords pass.

Typically, the box of the kit to which the invention relates preferably comprises an internal structure consisting of several plates with holes to hold pulleys over which the cords pass.

In a preferred embodiment, the kit to which the invention relates also comprises at least one fixing element enabling the support structure and the box to be fixed in a certain position on the sliding structure.

Typically, the sliding structure includes a pair of rails or guides along which the support structure, to which the box of the kit to which the invention relates is fixed, slides. In one embodiment, the box is moved along the sliding structure manually by the therapist, by simply pushing on the box or using a specific handle provided for this purpose. In an alternative embodiment, the movement would be aided by a motor.

In the kit to which the invention relates, the one or more supports are preferably comprised of any of the following types: a cervical support, a face support, a support for the upper limbs, a hand support, a dorsal support, a support for the pelvis and/or hip, a support for the lower limbs and/or a support for the feet. A vertical suspension harness is also contemplated for people with poor motor mobility of the legs (neurological patients among others).

Preferably, in the kit to which the invention relates, the cord or cords of the box comprise one or more of the following types: cords to treat the patient's cervical areas/head area, neck, upper limbs and upper dorsal area, cords to treat the patient's central body area, cords to treat the area of the patient's lower limbs and/or cords to treat the area of the patient's feet.

Preferably, in the kit to which the invention relates, the cord or cords are typically organised by body areas, associated to a support on which a part of the patient's body rests.

The kit to which the invention relates has many possible uses. By way of example, without limitation, the following can be mentioned:

Healthcare Use:
- Rehabilitation.
- Prevention of musculoskeletal complaints.
- Mobilisations of long-term bedridden patients.
- Recovery of mobility for neurological patients and patients with multiple injuries.

Home Use:
- Home-based rehabilitation with a therapist
- Home-based rehabilitation without a therapist Sports Use:
- Recovery from injuries and sport readaptation.

Other characteristics, advantages and objects of this invention will be obvious to an expert in the art on reading the following detailed description of the preferred embodiment of the invention.

BRIEF DESCRIPTION OF THE DRAWINGS

To complement the description to be made hereinafter and to aid understanding of the features of the invention, according to a preferred practical embodiment thereof, a set of figures, illustrative and not exhaustive, is attached as an integral part of this description, representing the following.

DETAILED DESCRIPTION OF THE PREFERRED EMBODIMENT

Figure 1:
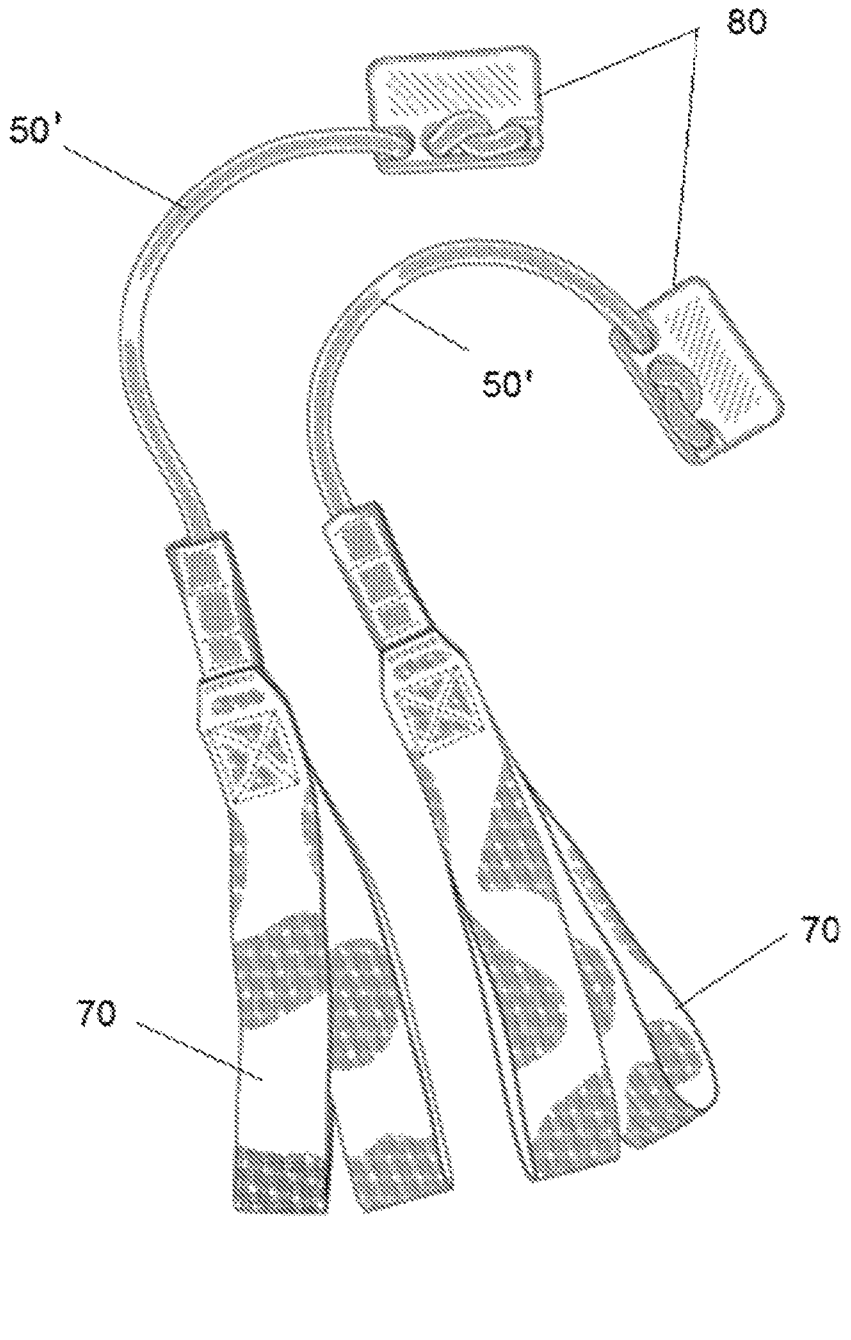
FIG. 1 shows the supports used for the patient's upper limbs in a therapeutic treatment kit in accordance with this invention.
Figure 2:
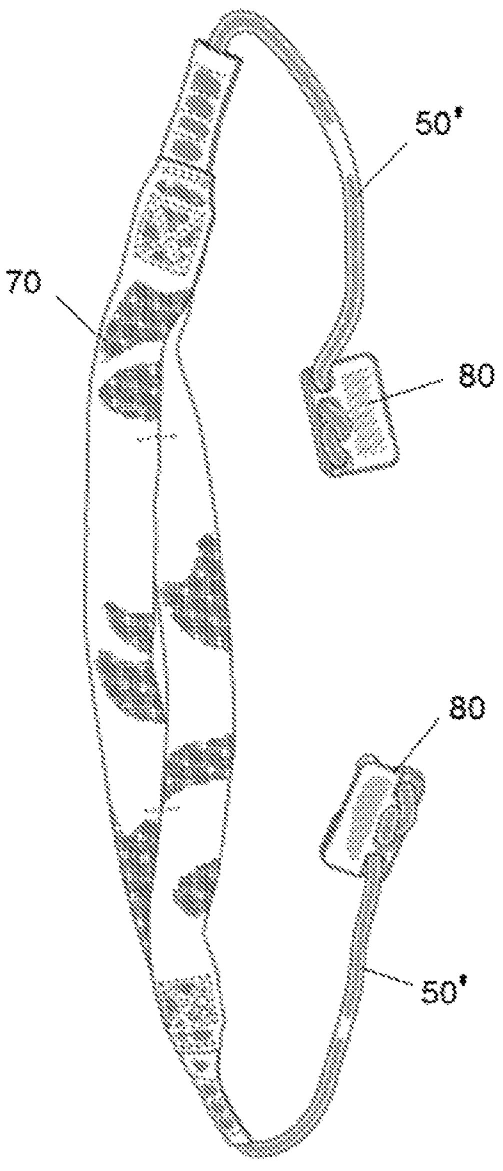
FIG. 2 shows a cervical support used in a therapeutic treatment kit in accordance with this invention.
Figure 3:
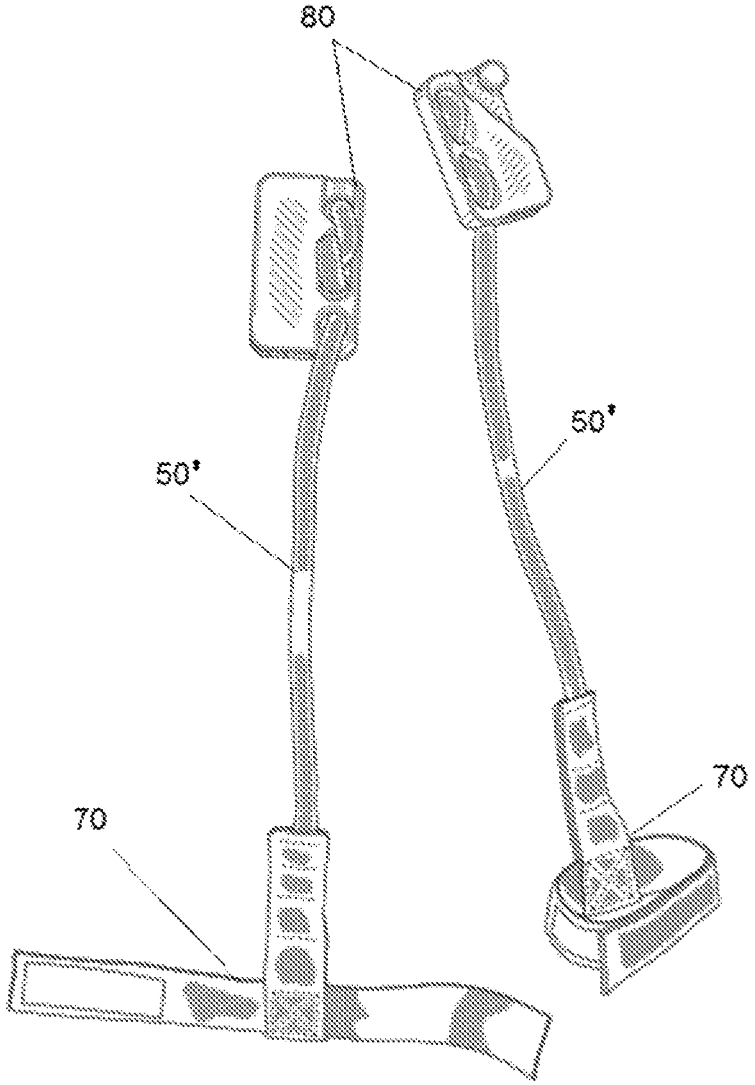
FIG. 3 shows the supports used for the patient's hands in a therapeutic treatment kit in accordance with this invention.
Figure 4:
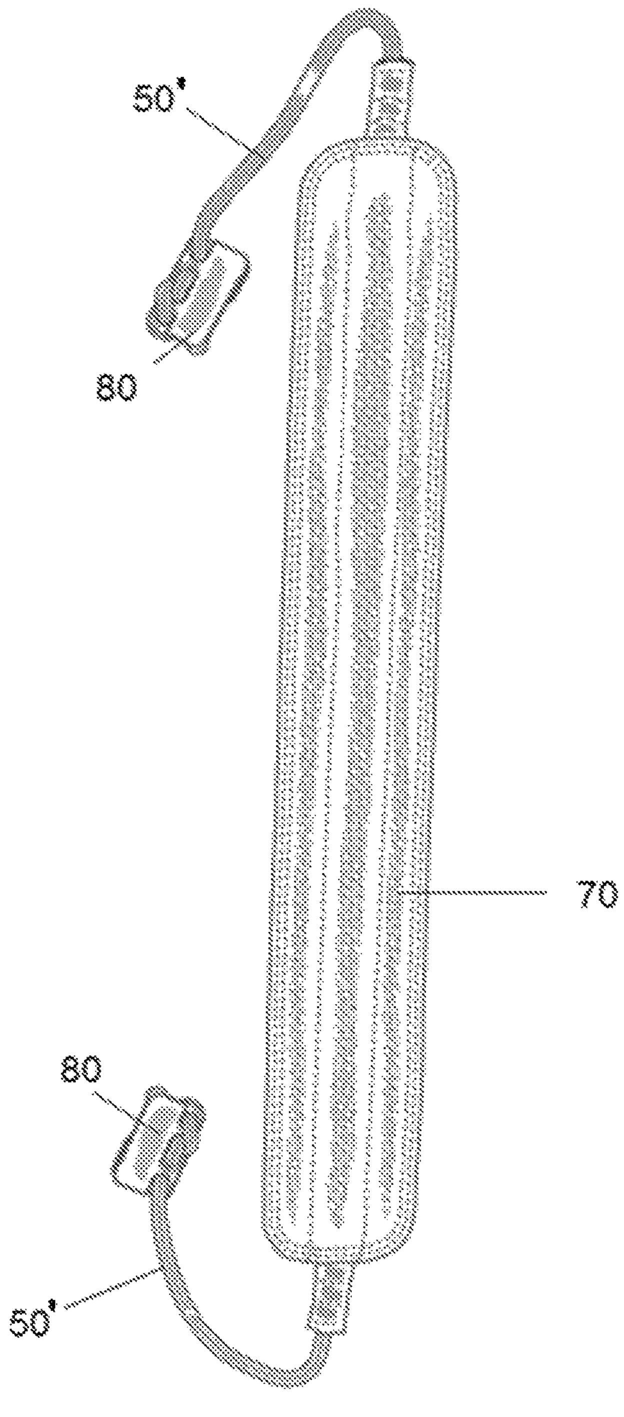
FIG. 4 shows a dorsal support for the patient used in a therapeutic treatment kit in accordance with this invention.

This invention relates to a kit 100 for therapeutic treatment of patients with muscular, joint or skeletal injuries: the kit to which the invention relates enables the patient to be placed in a position allowing them to be moved as necessary, with enormous flexibility of degrees of movement, while at the same time the therapist is in a very comfortable position from which to carry out their work, with no tension or awkward postures.

The kit 100 to which the Invention relates is designed for use by rehabilitation therapists, physiotherapists and medical professionals treating the said patients.

The kit to which the invention relates enables work on three axes of movement as if it were a three-dimensional system, so that the patient can move in any direction during the treatment. The kit 100 to which this invention relates therefore has major advantages for both the patient and the therapist, as described below.

The main benefits for the patient include the following: The patient is no longer subject to the limitations of the stretcher: for example, a patient with cervical problems must be positioned either face down or face up for treatment, so that the cervical vertebrae are not forced in this position. If the patient is placed face down, the cervical problems are technically not resolved, and it is therefore habitual to place the patient face up. However, in this position the physiotherapist has to raise and hold the patient's head with one hand and can only perform the treatment using the other hand, which is uncomfortable for both the physiotherapist and the patient. Also, in the aforementioned position (face up) it tends to be difficult for the patient to relax, and this discomfort causes them even more tension. However, on using the kit to which the invention relates, whereby the patient's head is suspended, the said suspension allows them to relax their muscles, as they are not involved in the movement, thus creating relaxing postures and positions in which a major sedative effect is created on stretching the muscles, ligaments and joints, transmitting peace and tranquility to the patient. Also, the work carried out on the stretcher limits the movements, as placing the head in the standard face hole of treatment stretchers is not comfortable, and the fact that the arms have to hang down the sides generates tension in the patient, even if use is made of the armrests some stretchers are equipped with: all these are often not the best positions for carrying out the work in question. Thus, using the kit to which the invention relates, the patient has great freedom of movement, and the movements carried out on the patient are also relaxed and free of tension, optimising the nature of the therapy provided.

Also, the main benefits for the therapist include the following, among others: firstly, the therapist's work gives rise to much tension, involving much physical effort, long hours of work on a stretcher in uncomfortable positions, lifting weights (a patient's head weighs around 7 or 8 kilos, for example), and this frequently gives rise to injuries to the therapists themselves. It is also difficult to move the patients on the stretcher, particularly if they are of heavy build. The kit to which the invention relates therefore substantially contributes to workplace risk prevention and to the possible prevention of work-related injuries.

Figure 13:
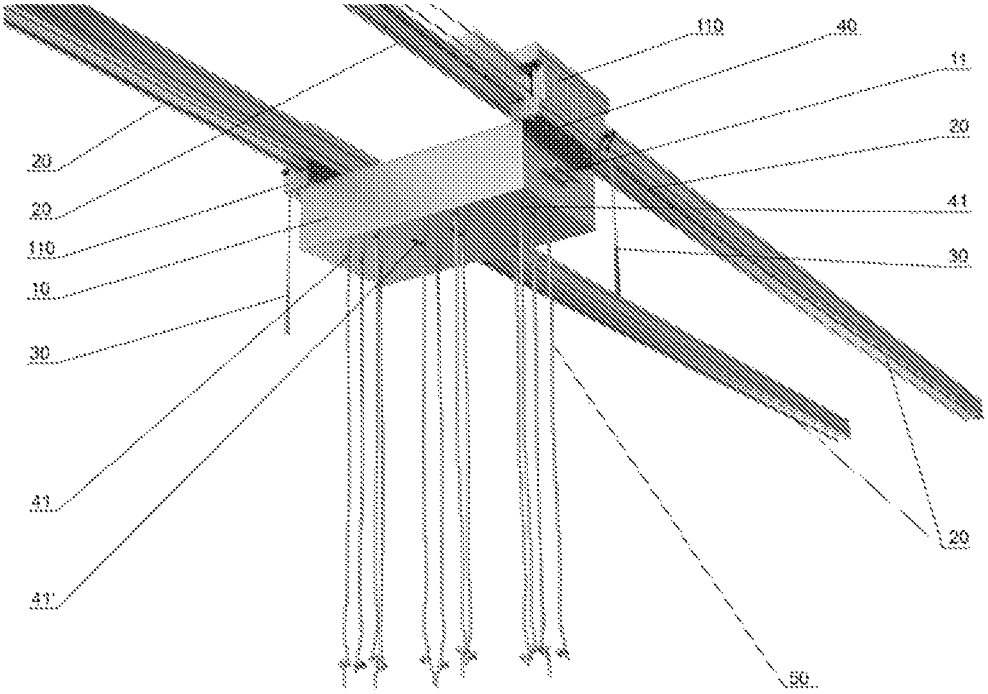
FIG. 13 shows the configuration of a therapeutic treatment kit in accordance with this invention.
Figure 14:
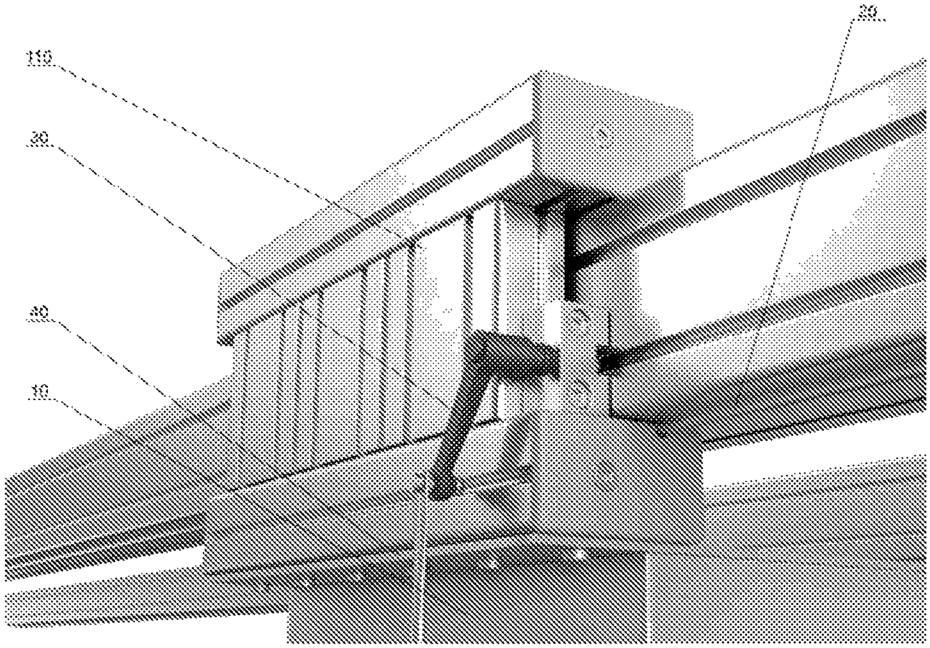
FIG. 14 shows details of a fixing element or brake of a therapeutic treatment kit in accordance with this invention.
Figure 15:
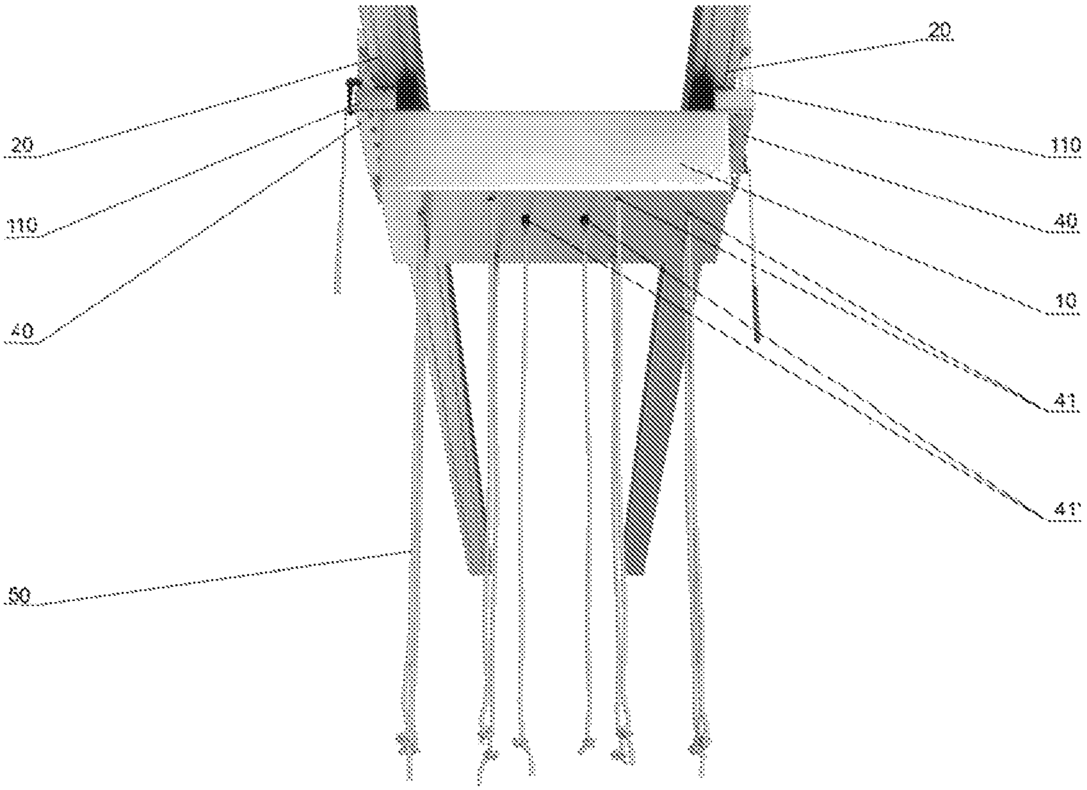
FIG. 15 shows the therapeutic treatment kit in accordance with this invention, with the cords loose and not gathered up.

FIGS. 13 and 15 show two overviews of the kit 100 to which the invention relates. As can be observed, the kit 100 comprises a box 10, which can be moved freely along a set of guides 20 forming part of a sliding structure 110, and fixed by a fixing element or brake 30 (shown in detail in FIG. 14) in the desired position according to the area of the patient's body to be treated. A number of cords 50 are hung from the box 10, the said cords being configured together with a series of supports or straps 70 suitable for raising or holding certain parts of the patient's body so that they can receive the desired therapy. The cords 50 cross and pass through the structure of the box 10 via holes 41 and 41'. Another advantage of the kit to which the invention relates is that it is totally configurable and adaptable, enabling the patient to be placed in the desired position so that they can receive the therapy. As will be later explained in more detail, the therapist places the patient on the stretcher or chair or surface to be used for treatment, moves the box by sliding it along the guides 20 until it is suitably positioned for the therapy to be performed, applying the brake when it reaches this position and thus immobilising the box on the sliding structure 110 via the fixing element or brake 30. When the box 10 is in the suitable position, the therapist arranges the cord or cords 50 with the necessary support or supports 70 so that they hold or raise the part or parts of the patient's body in whichever way the therapist has deemed adequate in order to perform the necessary therapy, subsequently proceeding to perform the therapy, with no tension or stress for either the patient or the therapist.

FIGS. 13 and 15 show different views of the box 10 with the cords 50 hanging from it. Depending on the number of cords being used in a particular treatment, the cords that are not in use can be easily gathered up on handles 11, arranged on the sides of the said box 10. In an alternative embodiment (not shown), the ends of the cords 50 may incorporate magnetised parts so that when the therapist is not using certain cords 50, the said cords will be fixed (magnetically) to the box 10 and will consequently not hinder the therapist's work.

By working these handles 11 manually, the therapist can move the box 10 along the guides 20. When the box 10 is suitability positioned in relation to the patient (who will be underneath the box, either on a stretcher or sitting on a chair, for example), the said box is immobilised via the brake or fixing element 30 shown in FIG. 14. The therapist will then select the cords 50 required for the treatment to be performed, leaving those that are not to be used gathered up on the handles 11 (or fixed to the box by magnets), and the support or supports 70 will therefore now be positioned on the said cords 50 so that the different parts of the patient's body can be raised and/or held in certain positions, as necessary for the therapy to be carried out.

Thus, FIGS. 13 and 15 show a preferred embodiment example of a sliding structure 110 along which the box 10 moves; this sliding structure 110 comprises a pair of guides or rails 20 suspended from the ceiling, to which a support structure 40 is detachably fixed and from which the box 10 is suspended. The sliding structure 110 of the kit 100 to which the invention relates can enable one or more boxes 10 to be installed on it: if there are several boxes several patients may be treated at once in the same room on stretchers arranged in parallel fashion, and there would therefore be one box 10 in accordance with the invention above each stretcher. For this purpose the same guides or rails 20 would be used and there would be a number of sliding structures 110 with their corresponding support structures 40 and boxes 10.

The box 10 joined to the support structures 40 is gently slid along the guides 20 using the sliding structure 110 until the therapist places it in the desired position, in accordance with the position of the patient on the stretcher. When the box 10 is in the correct position, the therapist fixes the sliding structure 110 to the guides 20 via the fixing element or brake 30 provided on the sliding structure 110. The box 10 comprises handles 11 for moving the box 10 along the guides 20, and also for gathering up the cords on the said handles. The handles 11 are preferably arranged on both sides of the box 10 and enable the therapist to easily and effortlessly move the box 10 using their hand.

In an alternative embodiment of the invention, the sliding structure may also comprise a small electric motor that drives the box, displacing it, thus substituting or aiding the manual displacement carried out by the therapist. In this case, the rails or guides 20 on which the sliding structure 110 is displaced may be provided with a rack structure to facilitate placing the box in the desired position. The automated movement of the motor will be activated manually by the therapist, by either a cable connection or remote control.

An alternative embodiment (not shown in the figures) envisages the possibility of being able to rotate the box 10 by 180°. In other words, while the support structure 40 does not move, the box 10 joined to it by an articulated connection is partially disengaged and rotates on its vertical axis until positioned in the exact opposite direction to the prior displacement. This function is performed by means of a system of bearings. This is particularly useful for certain types of dynamic treatment such as the case of a motor-impaired person using the device with a harness to aid in walking. As the person who is walking as part of their treatment therapy reaches the end of the rail, the box 10 will rotate 180°, enabling them to walk back again. Thus, when the patient reaches the end of the displacement rail (after having walked a few metres), the therapist simply turns the box 10 180° for the patient to continue with their therapy. If this was not the case, the therapist would have to take the patient down, removing all the harnesses and supports they were wearing, turn the patient around and fit them with all the supports, harnesses etc. again.

As has been described, when the box 10 reaches the desired position, the therapist activates the fixing element or brake 30 to fix the said box in place before beginning the patient's treatment. In the examples shown in FIGS. 13 and 15 and in the detail in FIG. 14, a fixing element or brake 30 is shown comprising a simple handle that works the sliding structure 110, locking the box 10 in place at the desired point on the guides 20.

As shown in FIG. 13 or 15, the box 10 also preferably comprises a number of cords or slings 50, typically arranged in pairs, whereby each cord is associated with a support or strap 70 on which a part of the patient's body will be placed. Preferably, each box 10 comprises the following cords or slings 50, organised and located according to the different parts of the patient's body to be treated, so that they are located at the suitable height of the area or areas of the patient to be treated:

Cords to treat the patient's cervical and head areas, neck, upper limbs and upper dorsal area.

Cords to treat the patient's central body area, which can also be blocked to hold the patient's pelvic area in place.

Cords to treat the area of the patient's lower limbs.

Cords to treat the area of the patient's feet.

The cords or slings 50 are typically distributed by areas of the body for treatment (cervical/head, central, lower, feet) and arranged in certain positions, interconnected by a series of pulleys 60 (see FIGS. 12C and 12D), so that typically each end of a cord or sling is connected with the ends of a support 70 in order to raise the area of the patient's body to be treated or hold it in a certain way. The cords or slings 50 in the different areas can be moved independently, via different pulleys, and they may also be adjusted differently as required for each position the patient is in. Thus, in the case shown in FIG. 12C, the pairs of pulleys are as follows, from top to bottom: The first pair of pulleys (the pair shown at the top) would correspond to the pulleys 60 to work the cord 50 corresponding to the cervical area; proceeding downwards, the second pair of pulleys 60 shown would correspond to the pulleys 60 for working the cord 50 corresponding to the dorsal, upper limbs, shoulder, elbow and hand area; the next two pairs of pulleys (in the middle of the figure) would correspond to the pulleys 60 for working the cord 50 corresponding to the lumbar and pelvis areas; the next pulleys 60 would be for working the cords 50 corresponding to the hip, knee and lower limb areas; the last pair of pulleys (at the bottom of the figure) would correspond to the pulleys 60 for working the cord 50 corresponding to the foot area.

The cords or slings 50 can be freely released (that is, both their ends may be left hanging from box 10, as shown in FIG. 13 or 15) or, if it is preferred for them not to be in the way, they can also be fixed to the box 10 by means of a simple hook, knot or, for example, a magnetic latch, among other systems. As also previously mentioned, they may also be easily fixed to the handle 11 for sliding the box 10, which can also be configured to perform the functions of fastening or holding the cords or slings 50, as previously described.

The kit 100 to which the invention relates also comprises supports 70 (shown in FIGS. 1 to 7), the purpose of which is to hold a particular part of the patient's body on the cords 50, also placing in a certain position the part or parts of the body to be treated. For example, to support the patient's cervical area, the corresponding support 70 will be placed under the patient's head, as shown for example in FIG. 17 (with the patient lying face down on the stretcher), and the two ends of the cord or sling 50 for the cervical area are then fixed to this cervical support: pulling on both ends of the cord or sling of this cervical support by means of the corresponding pulleys 60, the exact height above the stretcher at which the patient's head is to be suspended can be adjusted. The same figure, FIG. 17, also shows the use of a second support in the dorsal area, joined to the cord 50 corresponding to the dorsal area. The exact height at which the supports are fixed is determined by the retainers (detailed in FIG. 10) envisaged on the ends of the supports 70. By means of these retainers 80, the therapist quickly and easily secures the supports 70 using the ends of the corresponding cord 50, the cord/support unit thus being closed in the form of a loop that can be easily turned or slid over the pulleys in one direction or the other when the cords 50 of one side or the other are pulled. For example, in the illustration in FIG. 17, if the therapist pulls the cord 50 beside the patient's right shoulder downwards, the opposite cord 50 beside the patient's left shoulder will move upwards, thus causing the patient to turn so that they will no longer be facing the ceiling but rather facing slightly to their right.

The object of this invention is to succeed in placing the patient in the most adequate position for their treatment, being totally configurable, so that they can subsequently be treated by the therapist, who will also be in the most adequate position and with less tension for carrying out their work and will also have both hands free to be able to perform the therapy.

Figure 8:
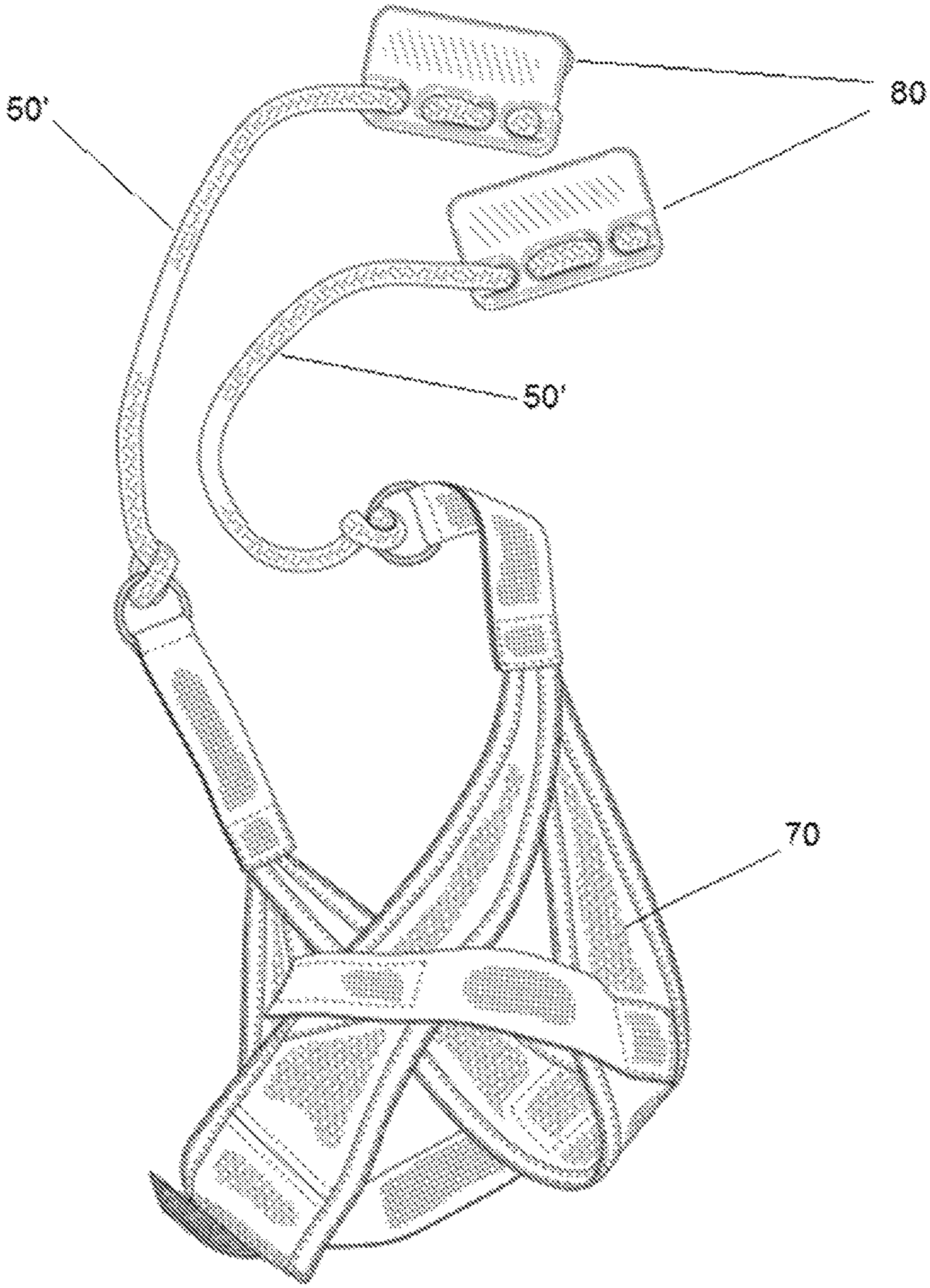
FIG. 8 shows a cranial support used in a therapeutic treatment kit in accordance with this invention.

The kit 100 to which the invention relates will thus comprise different specific supports 70 for optimally holding different parts of the patient's body for treatment. Preferably, the kit 100 will be completed by the following supports:

a) cervical support (FIG. 2)
b) facial support (not shown)
c) support for the upper limbs, typically arms and forearms, with a special design, consisting of a double band leaving a hole in which to place the elbow (FIG. 1)
d) support for the hands (FIG. 3)
e) support for the dorsal area (FIG. 4)
f) support for the pelvis and/or hip (FIG. 5)
g) support for the lower limbs, typically the legs (FIG. 6)
h) support for the feet (FIG. 7)
i) harness for vertical suspension of people with poor motor mobility of the legs (not shown in the figures)
j) cranial support (FIG. 8)

It is important to note that although each support has been accordingly designated with the name of the area of the body with which it is preferably to be used, this does not imply that it cannot be used with other areas of the body. It has thus been envisaged that all the supports 70 can have several uses and can be used with different parts of the body as required. For example, in the examples of treatment shown in FIGS. 18, 19, 20, 21 and 22, the hip support (corresponding to the diagram in FIG. 5) is being used for the patient's leg.

As can be seen in FIGS. 1-8, the conceptual configuration of the supports 70 is more or less common to all the different types represented. Firstly, on all the supports 70 there is a holding part specifically designed to optimally hold in place the area of the body to be raised or held (cervical area, hands, pelvis, etc.). This part may take the form of a band of differing widths (see FIG. 4 or 5), it may be configured in the form of a loop (see FIG. 1, 2 or 6) and it may be equipped with additional securing means (for example, in FIG. 3 or 7 a Velcro® fastener is envisaged). The material of which this part is made will preferably be textile or plastic materials especially adapted for adequate breathability. Secondly, the end or ends of the supports are prolonged by cords 50' which in turn end in retainers 80, enabling them to be joined to the ends of the cord 50 of the box.

Figure 9:
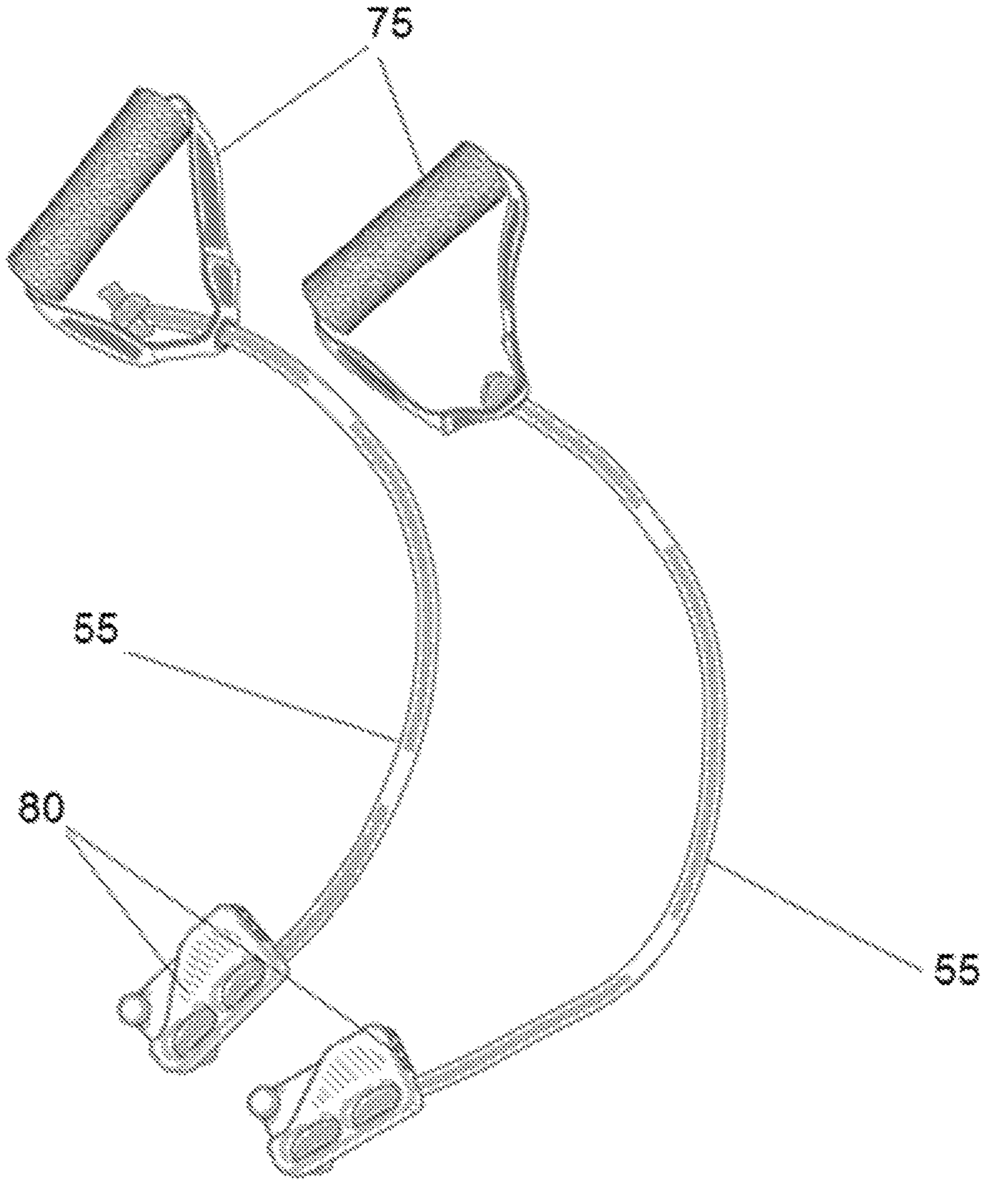
FIG. 9 shows a pair of supports with elasticated cords used in a therapeutic treatment kit in accordance with this invention.

As shown in FIG. 9, the cords 50' forming part of the supports 70 may be elasticated cords permitting a certain degree of elongation in order to perform dynamic treatments. That is, in such cases the patient, supervised by the therapist, will carry out certain movements without help. On this type of support, the holding part of the support 70 is configured as a handle 75 which will be grasped by the patient in a similar fashion to other gym devices comprised in the state of the art.

Figure 10:
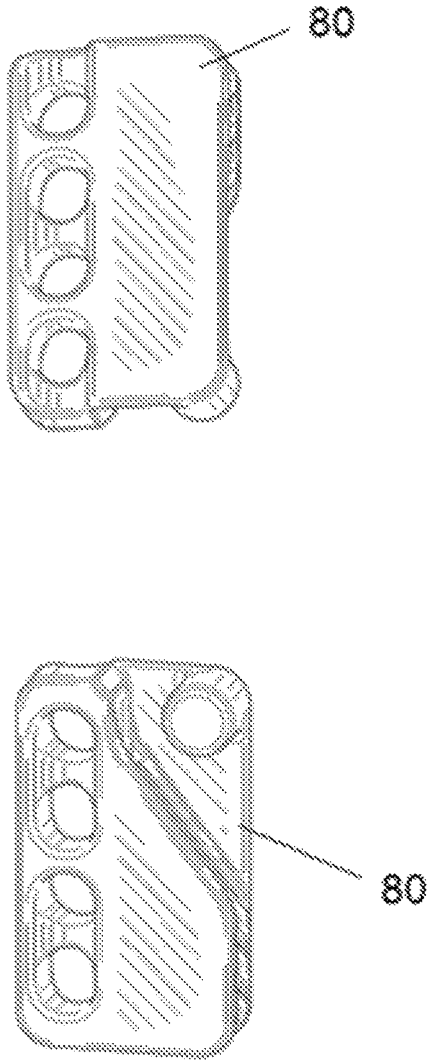
FIG. 10 shows the retaining elements for the cords, used in a therapeutic treatment kit in accordance with this invention.

A part that is essential for assembling the kit 100 to which the invention relates is the anchoring systems or retainers 80, as shown in detail in FIG. 10, and as shown assembled in FIGS. 1-9. As shown in FIG. 10, each of the retaining elements 80 is configured on the basis of a part that is prismatic in section and has an approximately rectangular base and rounded corners. At one of its ends, four holes have been provided, serving for tying or fixing the cords 50' of the supports 70 (see FIGS. 1-9). At the other end, a recess in the part has been envisaged, crossing it transversally from a shorter to a longer side, forming a kind of groove especially envisaged for the cords 50 of the kit 100 to pass through. The part also has a protuberance or stud on one of its ends. On passing the cord 50 through the groove, the weight of the patient's body (or part of the body being treated) causes the part to turn and the stud or protuberance serves as a locking brake.

Figure 16:
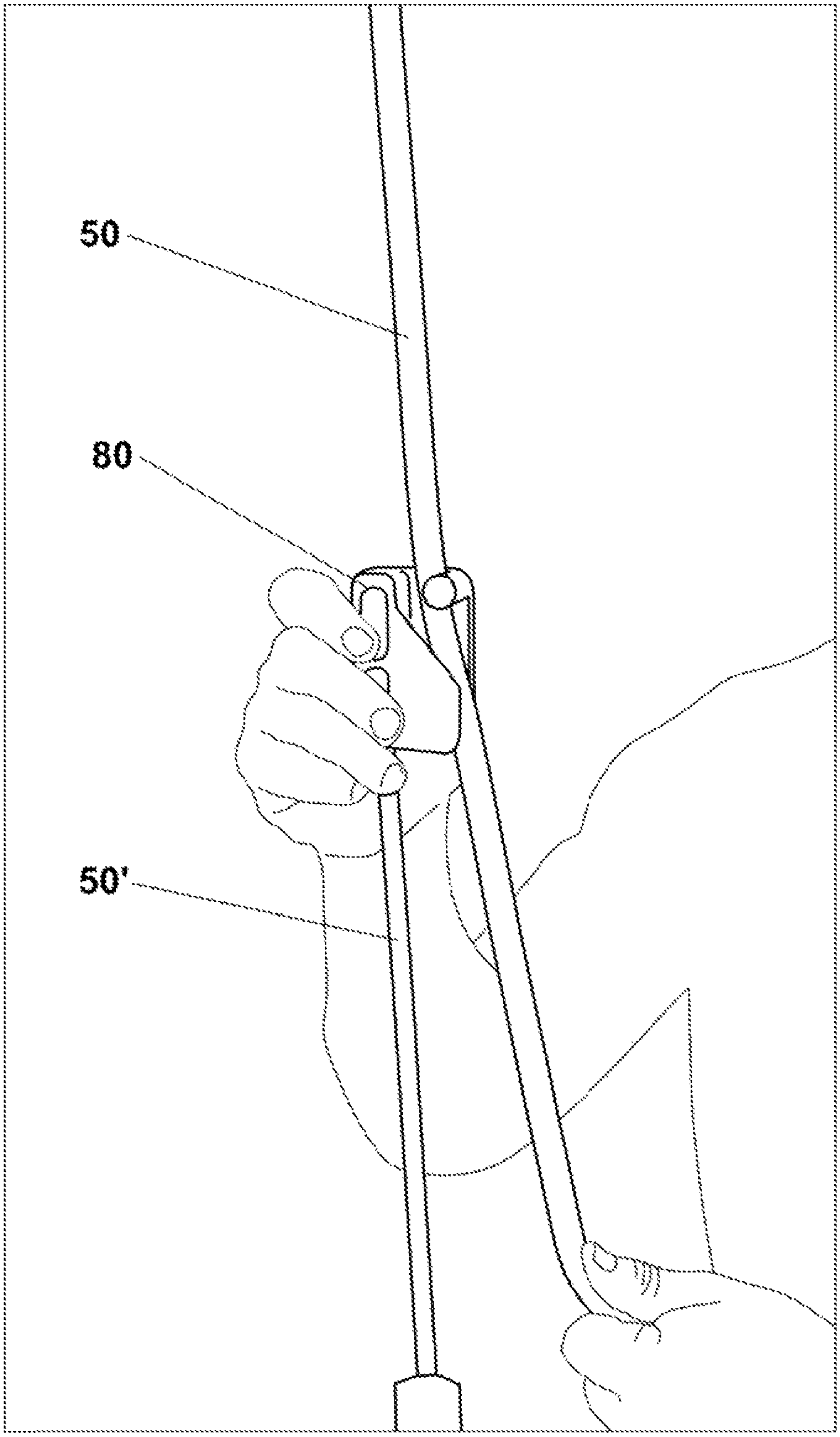
FIG. 16 shows a retaining element being placed on one of the cords of a therapeutic treatment kit in accordance with this invention.

These anchoring devices or retainers 80 are configured so that they can very easily be fastened to the cords 50 of the kit 100. As shown in the attached Figures, once the cords 50, together with a support 70, have been adjusted to a certain length (on running over the pulleys 60), this position is fixed by the retainers 80, previously tightening the cords 50, as shown in detail for example in FIG. 16. The therapist, with one hand, secures the retainer 80 connected to a support 70 by means of the cord 50' in an approximately vertical position as shown in the figure and effortlessly passes the cord 50 through the groove provided in the retainer. On releasing the retainer 80, the weight of the patient's body creates downward traction on the cord 50' which in turn causes relative rotation of the retainer 80, thus trapping the cord 50.

In an alternative embodiment (not shown) the retaining elements 80 incorporate a magnet enabling them to be fixed to the box 10 (which will preferably be metal) in a very simple fashion when they are not being used.

Figure 11:
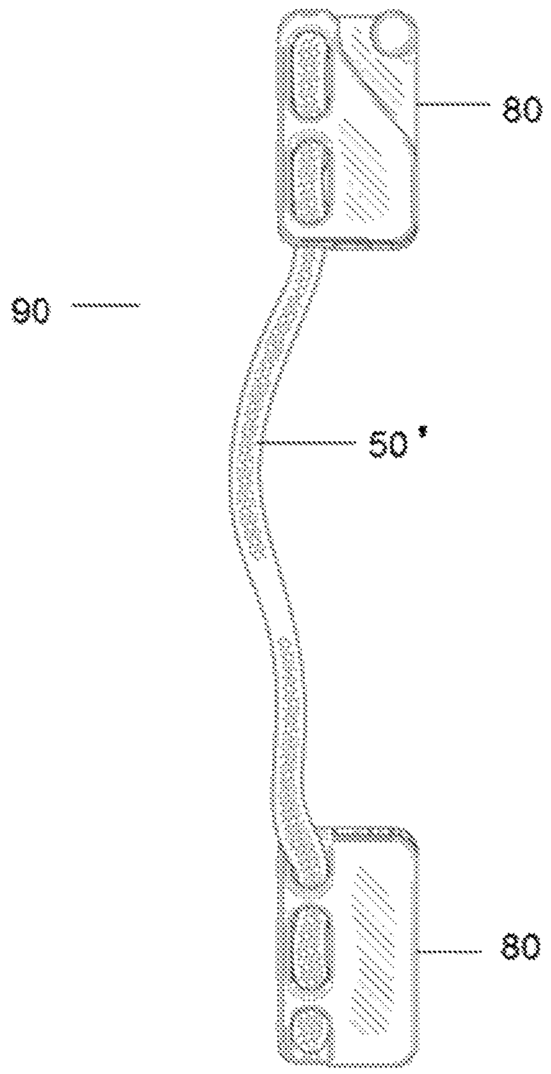
FIG. 11 shows a modulating element comprised of a pair of retaining elements and a cord, used in a therapeutic treatment kit in accordance with this invention.

FIG. 11 shows a structure called a "modulator" 90, comprised of two retainers 80 joined by a short cord 50', approximately 30 cm in length, which serves as a connector and allows several supports to be adjusted and tightened at the same time, so that they can work together jointly and coordinately. One of the retainers 80 of the modulator 90 will be connected to one of the supports (FIGS. 1-9) and the other end will be connected to another support with which it is to work jointly.

Figure 12A:
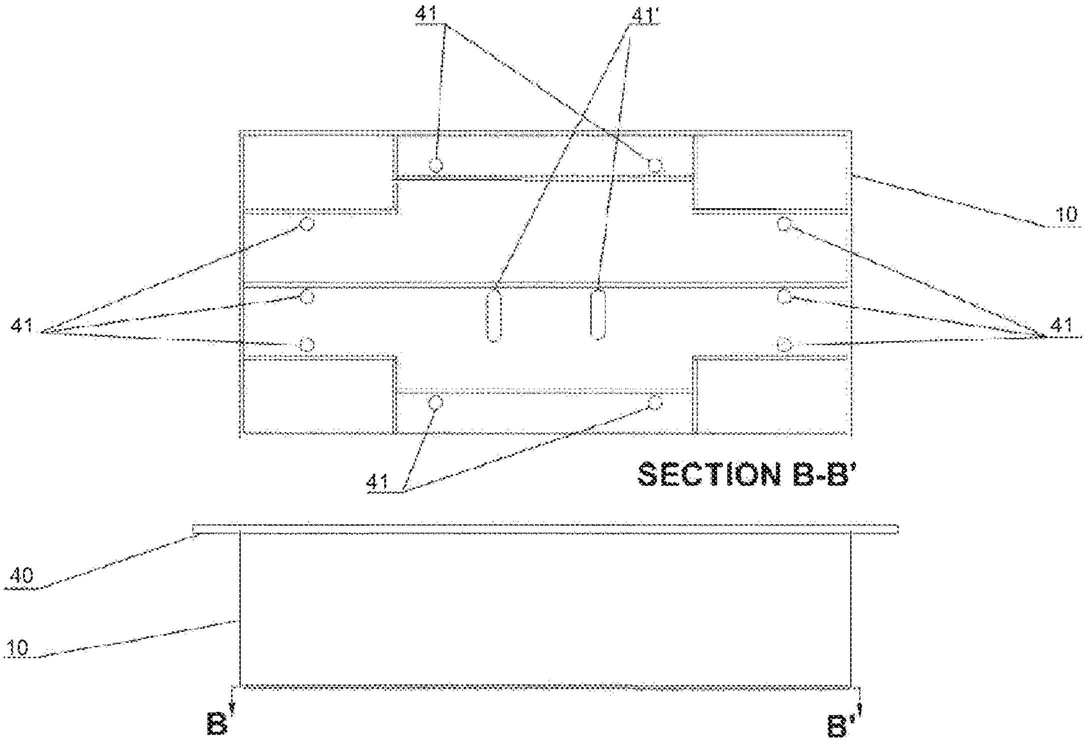
FIG. 12A shows a cross section and an elevation view respectively of a box and a support structure on which the box is mounted, in a therapeutic treatment kit in accordance with this invention.

FIG. 12A shows a cross-section and elevation view respectively of the box 10 and a support structure 40 on which the box 10 is mounted or from which it is suspended. The cords 50 can pass through the structure of the box via holes 41 and 41'. These holes 41 and 41' are spatially distributed so that their dimensions adjust to the habitual proportions of the human body, thus facilitating the procedures for raising the different parts of the patient's body and holding them in place. Thus, as shown in a possible embodiment in FIG. 12A, the holes 41 are distributed over the front and rear areas, and determined in the central area of the same. In the example shown in FIG. 12A, almost all the holes 41 are represented with a circular section more or less similar to the diameter of the cords 50 (with the logical tolerance so that they can slide through them), and two of the holes 41' (those shown in the central part of the figure) are represented as elongated in shape. The reason for this is that it has been envisaged that on the inside of these two holes 41' there should be a locking part 85 that will serve to lock or secure the cord in a fixed position. That is, by means of lateral traction of the cords 50 entering through these elongated central holes 41, the therapist can enable the said cords to remain in a fixed position (blocking the activation of the pulleys) as the cords will be retained or clamped by the locking devices 85.

Figure 12B:
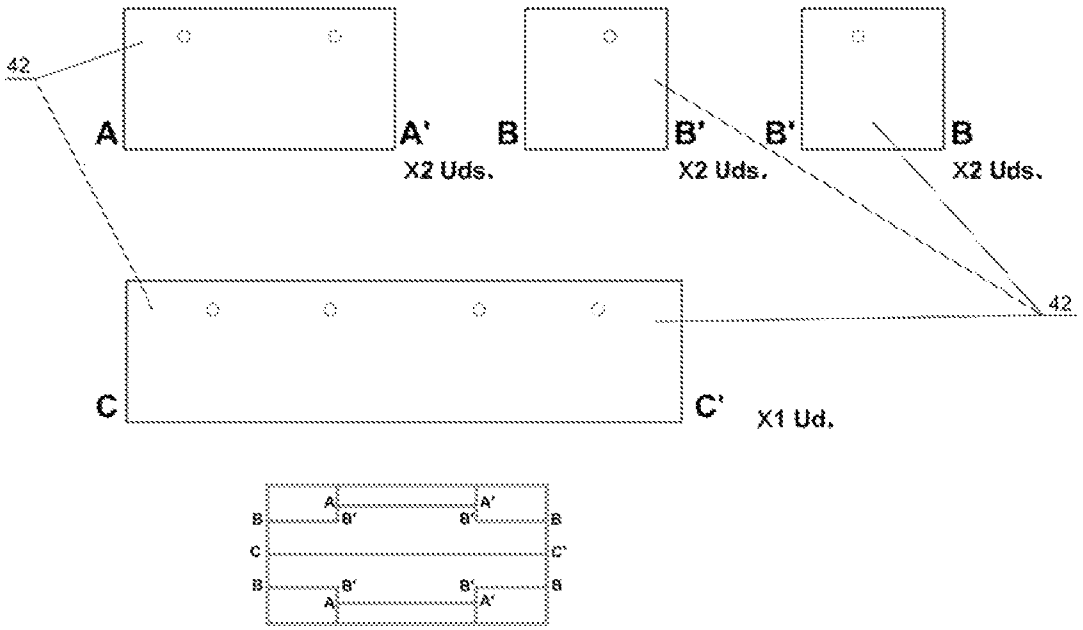
FIG. 12B shows the plates of which the box is comprised in a therapeutic treatment kit in accordance with this invention.

FIG. 12B shows the plates 42 contained inside a box 10 used in a kit such as the one to which the invention relates. As can be observed, the plates are provided with their corresponding holes for securing the pulleys 60.

Figure 12C:
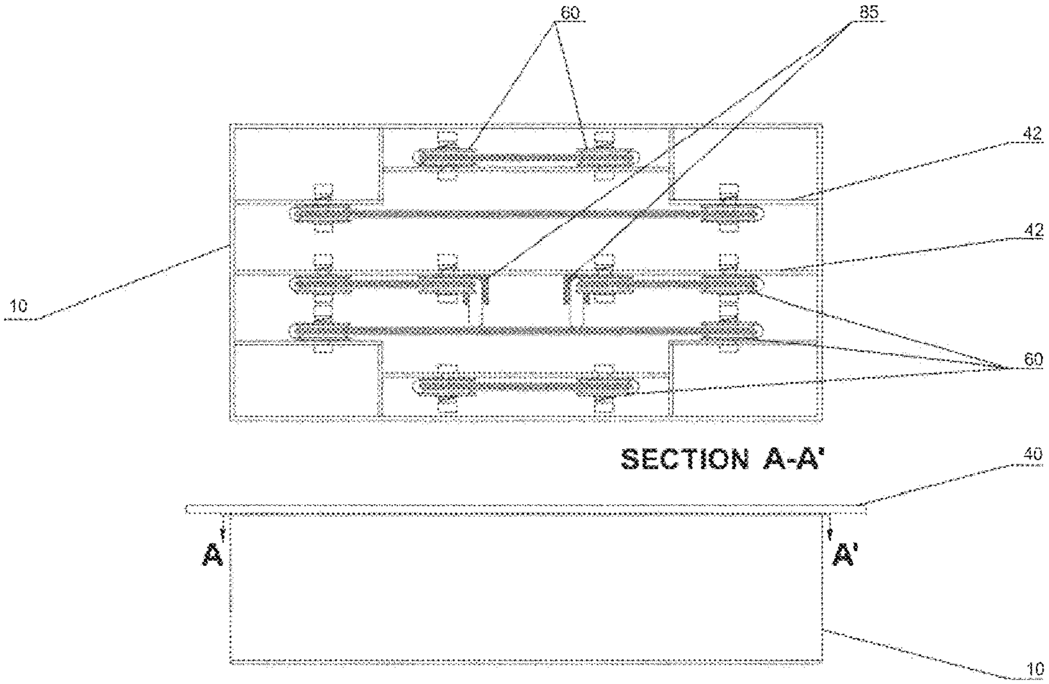
FIG. 12C shows a cross section and elevation view of the configuration of the plates of which the box is comprised in a therapeutic treatment kit in accordance with this invention, also showing the arrangement of the pulleys over which the corresponding cords run.

FIG. 12C shows a cross-section and an elevation view respectively of the configuration of the plates 42 comprising the box 10 in the configuration shown in the previous figures, showing the pulleys 60 over which the cords 50 run and whereby these cords can be tightened and maintained fixed in a certain position according to the corresponding therapy to be carried out, by means of the locking devices 85. In the embodiment shown, the pulleys are simply secured by a bolt that passes through the holes in the plates 42 and is secured by a simple nut and pressure washer.

Figure 12D:
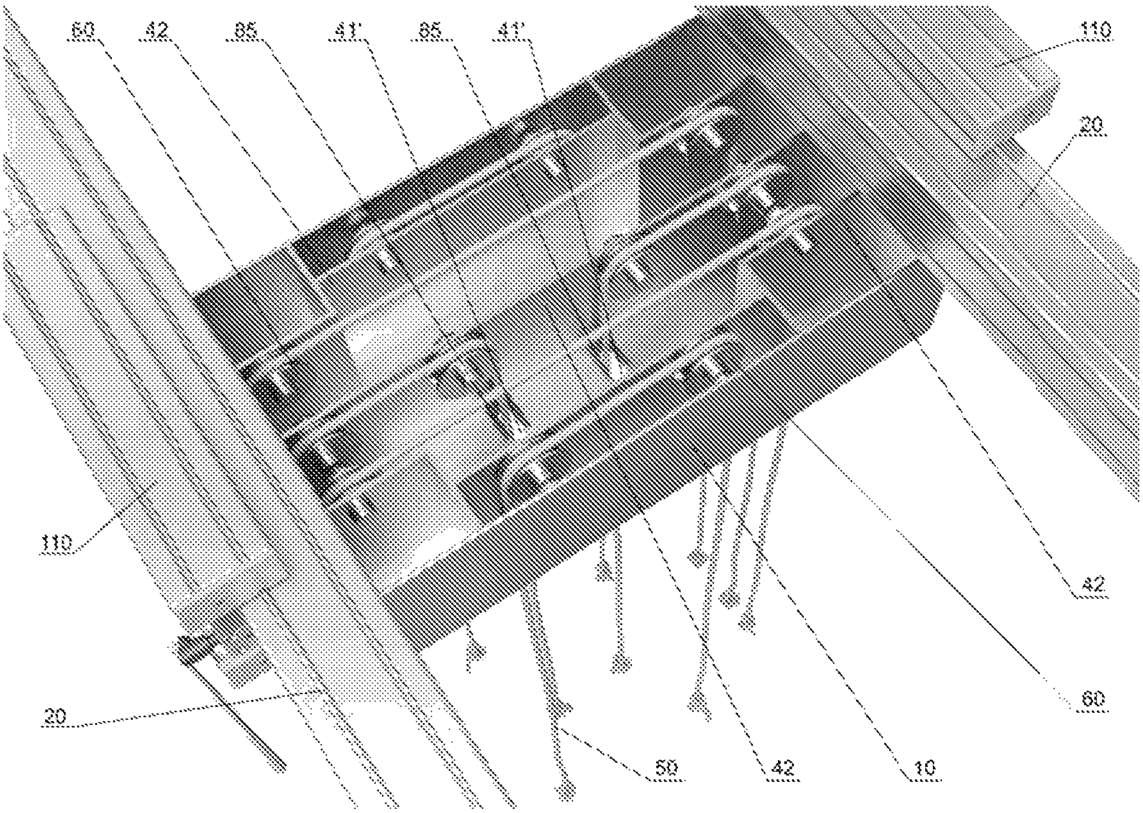
FIG. 12D shows a 3D view of FIG. 12C, the support structure having been removed for a better view of the plates and pulleys. A partial view of the sliding structures with their corresponding guides is also shown.

FIG. 12D shows a 3D view of FIG. 12C, having removed the support structure 40 for a better view of the plates 42 and pulleys 60 inside the box 10. A partial view of the sliding structures 110 with their corresponding guides 20 is also shown. As can easily be observed, the interior of the box 10 comprises a structure formed by several plates 42 provided with their corresponding holes for holding the pulleys 60 over which the cords 50 run. As shown in the figure, the cords 50 of the box are associated with different pulleys 60, so that they can be moved and/or adjusted separately. Each cord 50 runs over two pulleys 60 so that when one end of the cord 50 is pulled the other end of the cord is obviously displaced in the opposite direction. The figure also shows the two holes 41', provided with their respective locking parts 85 which serve to lock or secure the cord 50 in a fixed position.

Several examples of treatments for patients with certain types of injury are described below, referring to the attached figures indicated, using the same kit to which the invention relates but configured differently according to the patient's needs.

Figure 17:
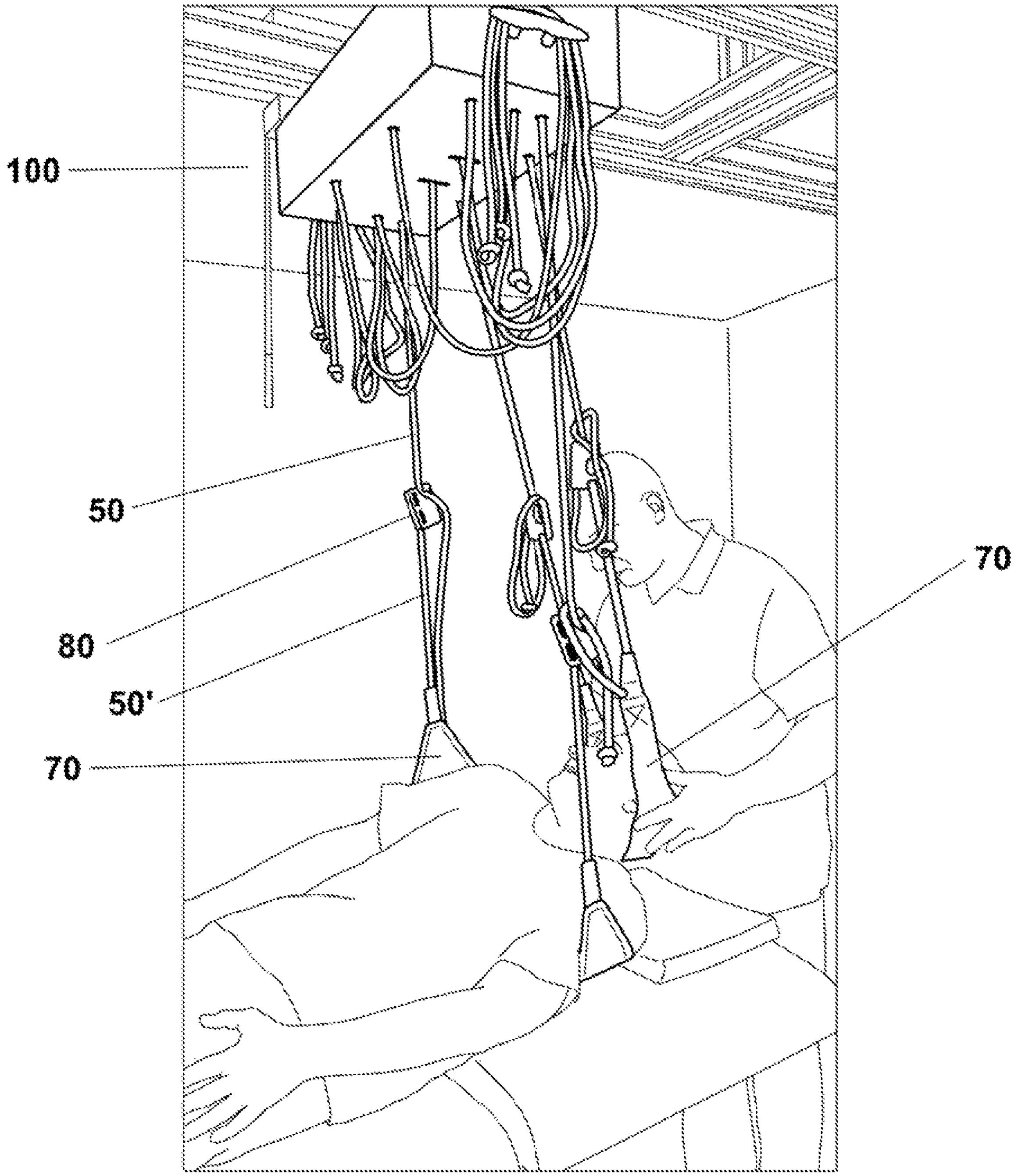
FIG. 17 shows one of the possible options for treatment of a patient with a therapeutic treatment kit in accordance with this invention, arranged so that a cervical support and a dorsal support are supporting the patient.

FIG. 17 shows a first example, corresponding to cervical treatment of a patient lying face up on a stretcher. For this treatment, the patient's head is lifted slightly and the corresponding cervical support 70 is placed underneath it (as shown in detail in FIG. 2). This cervical support 70 is connected to the ends of the cord or sling 50, thus securing the patient's head so that the support that previously secured it on the stretcher can be removed. The patient's head can be raised, lowered, turned, stretched, rotated etc. using either end of the cord or sling 50: the advantage is that there is no tension and that the therapist has both hands free (as they do not have to hold the patient's head). Also, the therapist can access all the patient's muscles from below, from the neck to the dorsal area. FIG. 17 shows this arrangement, in which a second support 70 has also been placed on the patient's dorsal area (corresponding to the one shown in detail in FIG. 4), so that the patient is in an accessible position for cervical treatment and the posture for treatment is comfortable for both the patient and the therapist.

If the therapist wishes to continue working, as the effect of the injury continues down the patient's arm, for example, they would use a third corresponding support 70 for the arm (support for upper limbs, as shown in FIG. 1), connecting it in the area of the upper support, working its cord to raise it to the desired position. The therapist would then also be able to move or turn the patient's arm. They may also ask the patient to move their arm to determine how the movement is made. In any case, the therapist's hands would always be free during this entire process, and the patient would be in a very relaxed position.

It would also be possible to perform the cervical treatment on the patient in lateral position on a stretcher (not shown in FIG. 17). In this case, the patient would be placed in lateral position on a stretcher and the support or strap 70 for the head (cervical support) would be passed under the patient's head, as in the previous example in FIG. 17, lifting the patient's head to the desired position (no pillows or similar would be required to place the patient's head in the desired position). Given that in this position it would also be necessary to raise the patient's arm to be able to work, a second specific support or strap 70 for the arm would be placed (corresponding to the one shown in detail in FIG. 1). A third support 70 for the hand would also be used. In this case, both the second and third supports corresponding to the arm and hand would be suspended from the cord corresponding to the upper limb support and would be joined by a modulating structure 90 (as shown in FIG. 11) comprising a short cord and two retaining elements 80, so that this modulating structure 90 would enable the joint coordinated action of two of the second and third supports and the cords 50 of the box 10 to which it is joined.

As a result of the combined action of all these elements comprising the kit to which the invention relates, the patient is ultimately in a relaxed position and with a huge capacity for movement, enabling the physiotherapists to work much more easily and in comfort, each in accordance with their own handling techniques. The specific techniques may be any of those habitually used by physiotherapists. What the kit to which the invention relates really makes possible is that it facilitates each therapist's use of their own specific techniques. Thus, the kit to which the invention relates enables working with the patient to be either:

active: the patient makes certain directed movements, supervised by the therapist; or passive: the patient is simply handled or moved by the therapist.

Figure 27:
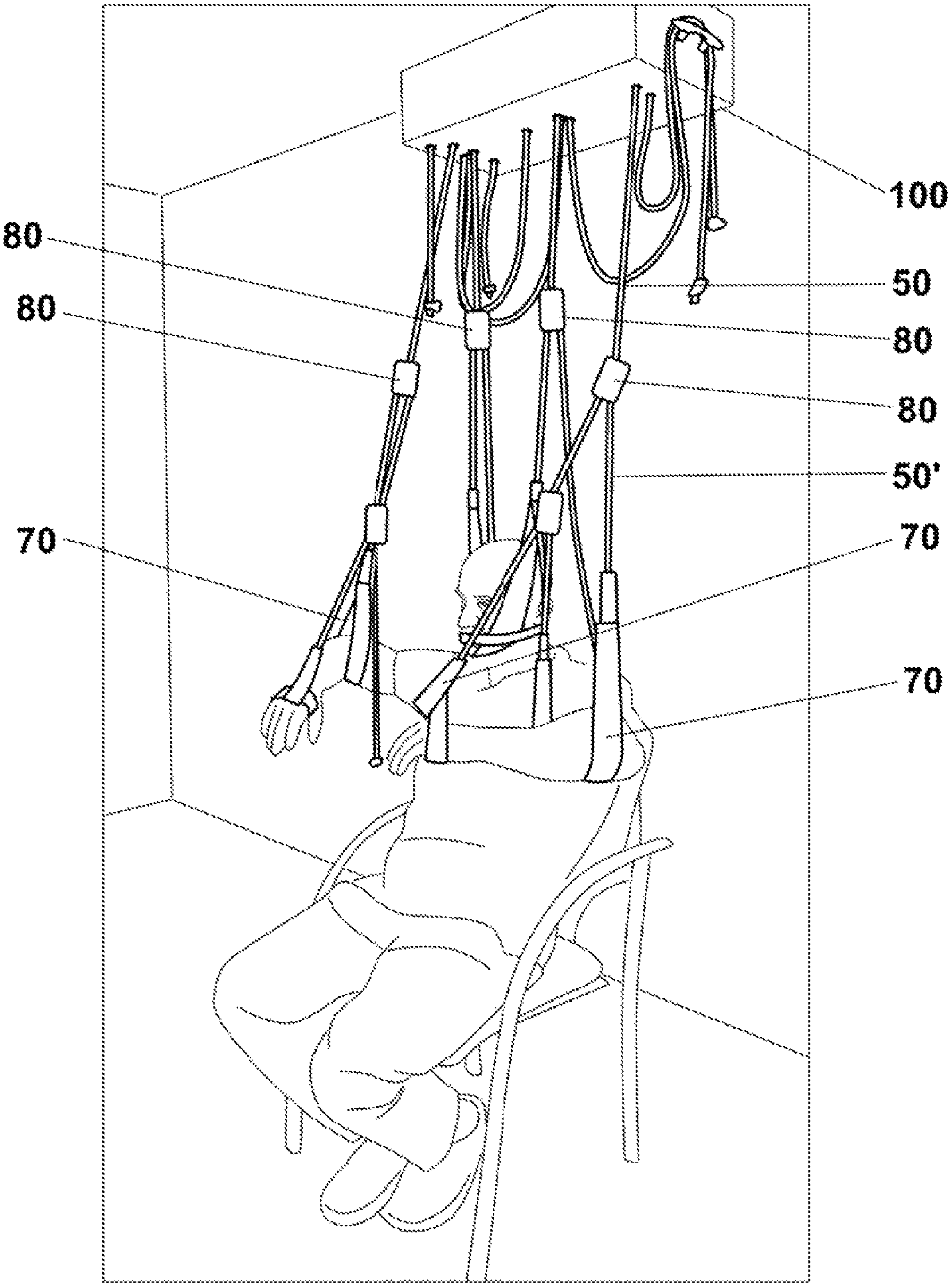
FIG. 27 shows one of the possible options for treatment of a patient with a therapeutic treatment kit in accordance with this invention, whereby the patient is treated for a cervicocranial complaint in sitting position, with cranial, upper limb and hand supports having been placed on the patient.

Another possible therapy would be cervical treatment of the patient, performed with the latter sitting on a chair (as shown in FIG. 27). In this case, two supports 70 for the patient's arms would be placed, followed by a third support 70 to specifically secure the patient's head, leaving their neck free. The therapist would then be able to treat the patient with the necessary movements, as indicated in the previous examples.

Figure 5:
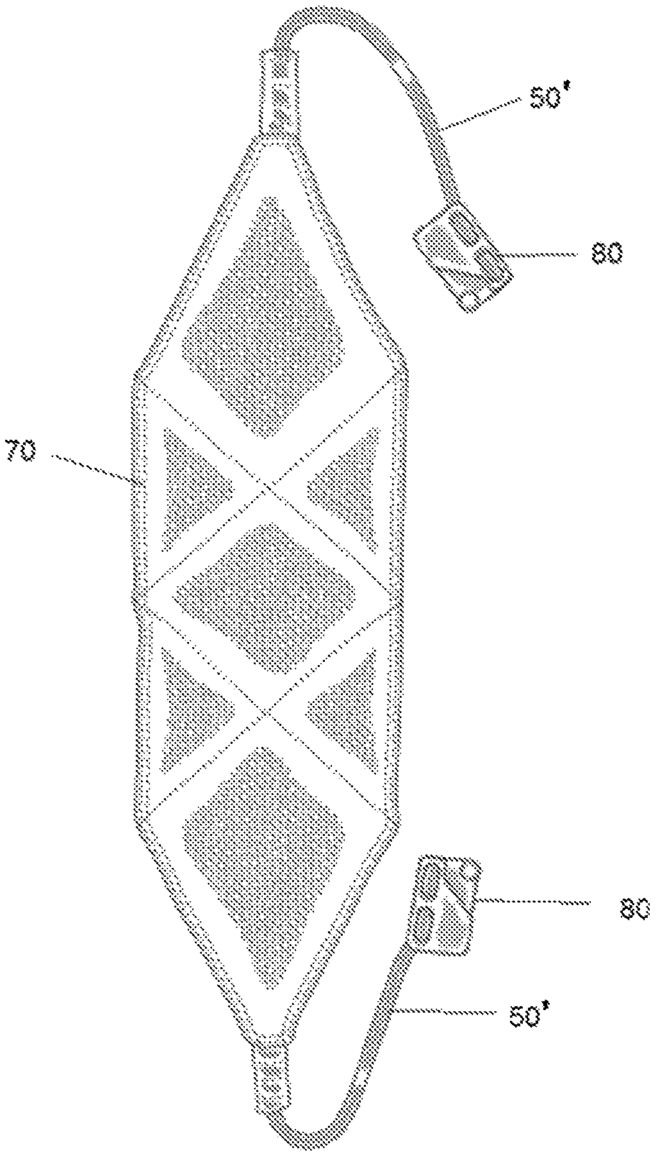
FIG. 5 shows a pelvis and/or hip support for the patient used in a therapeutic treatment kit in accordance with this invention.
Figure 6:
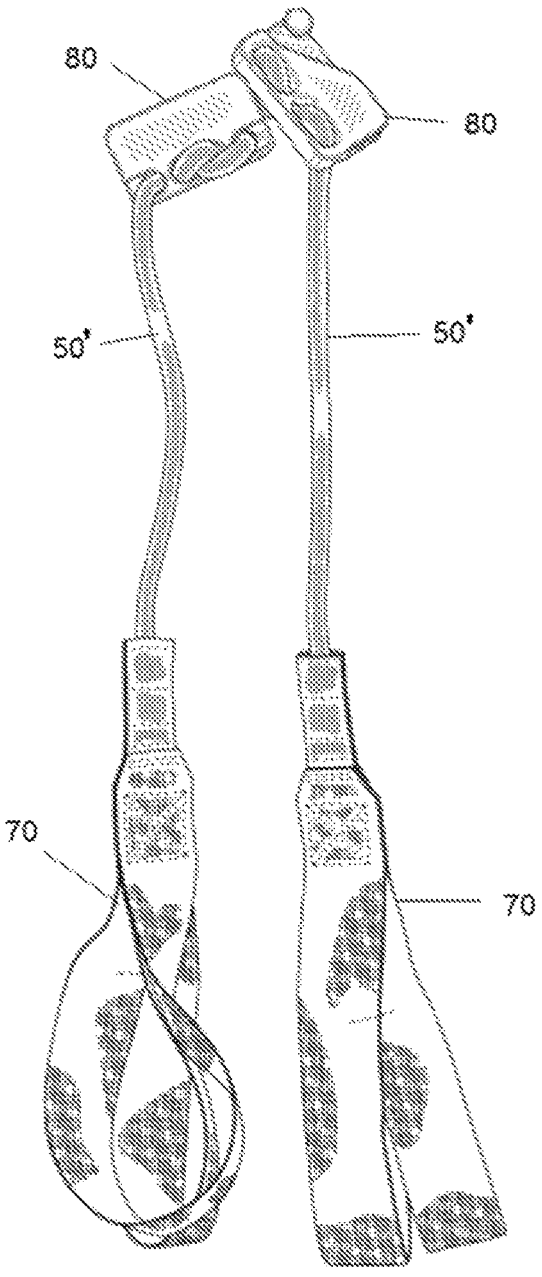
FIG. 6 shows the supports for the patient's lower limbs used in a therapeutic treatment kit in accordance with this invention.
Figure 7:
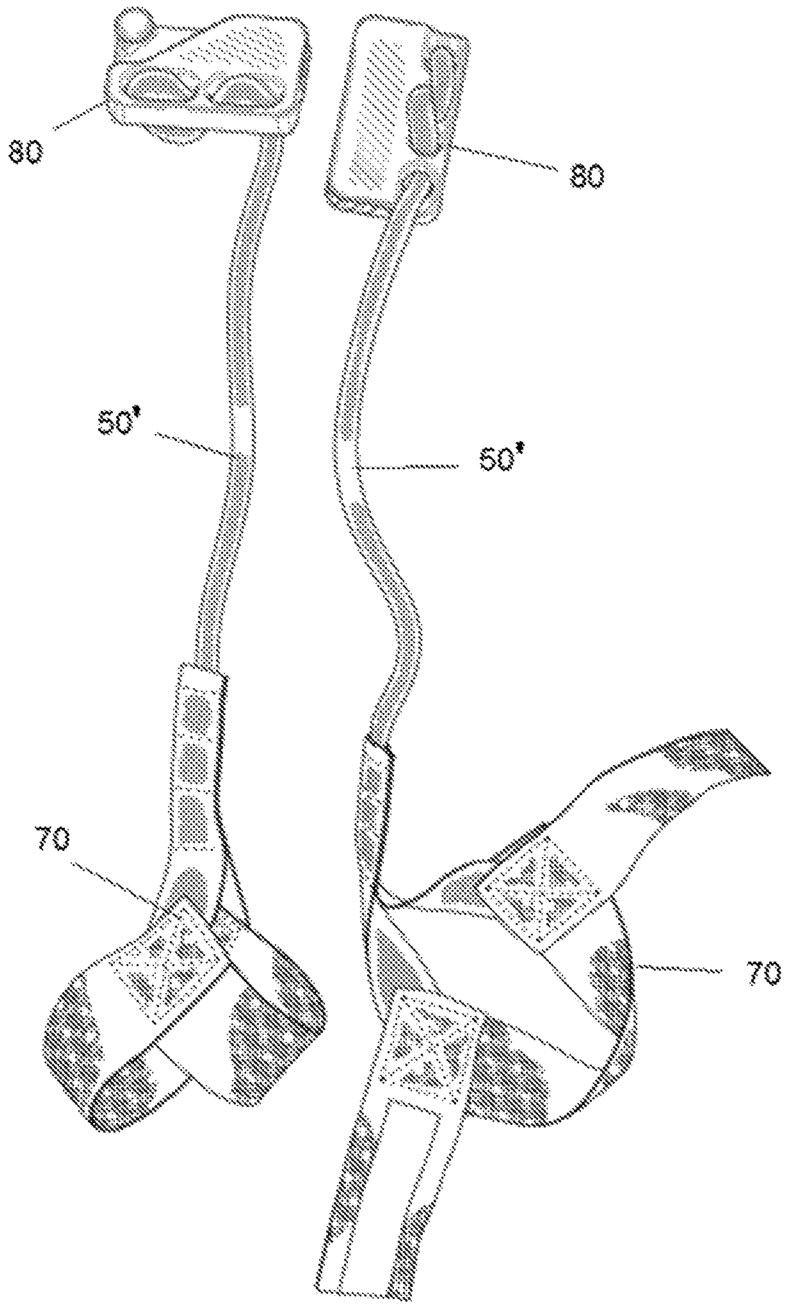
FIG. 7 shows the supports for the patient's feet used in a therapeutic treatment kit in accordance with this invention.
Figure 18:
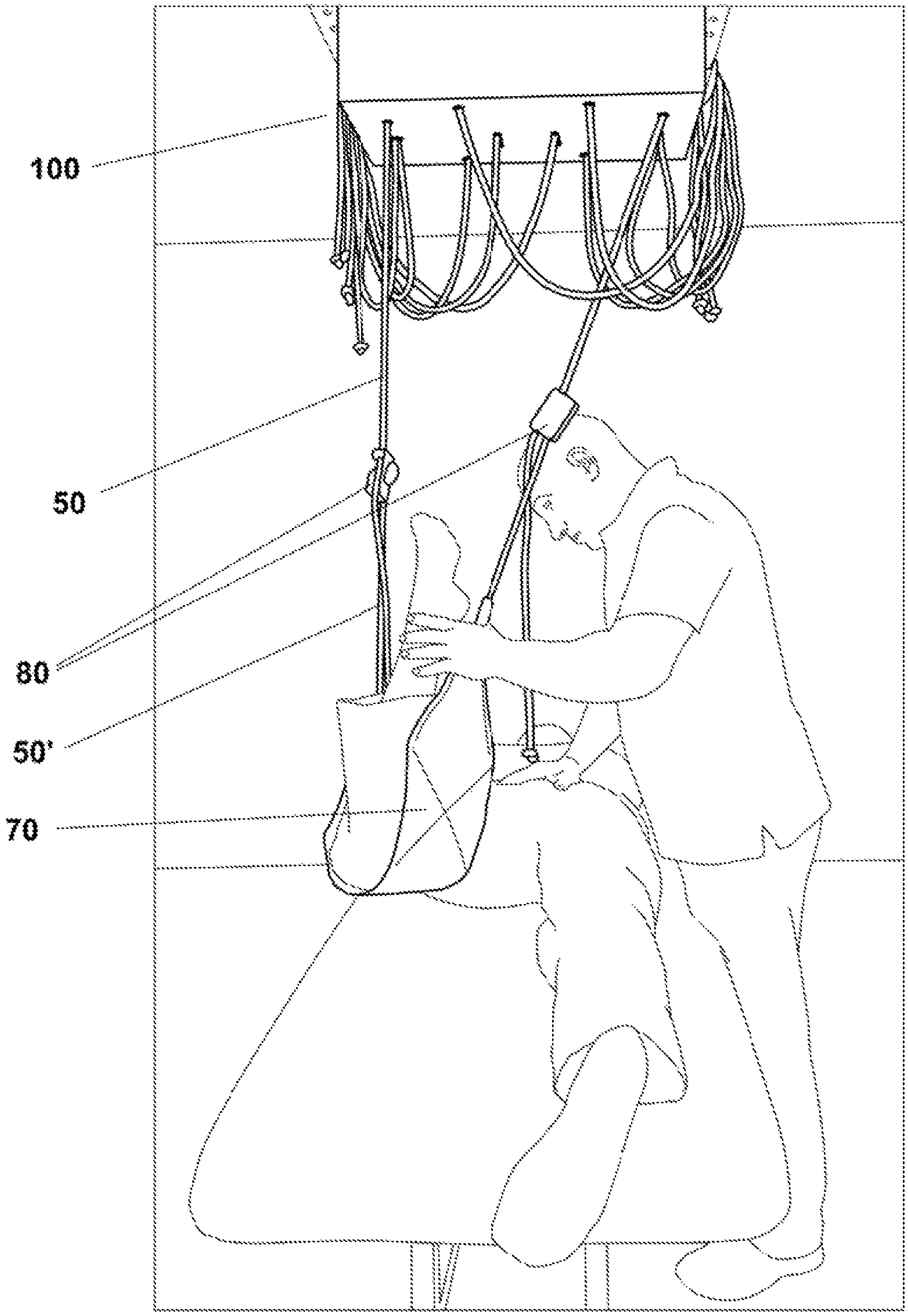
FIG. 18 shows one of the possible options for treatment of a patient with a therapeutic treatment kit in accordance with this invention, arranged so that a pelvis and/or hip support is placed under one of the patient's legs so that a hip extension exercise can be performed.

FIG. 18 shows the positioning of the patient with the kit 100 to which the invention relates in order to perform a hip stretching exercise: using a cord 50 for lower limbs, located at one end of the box, the hip support 70 (as shown in FIG. 5) is placed so that the therapist can bend the patient's corresponding leg, lifting the lower part of the same while drawing in and pressing down to secure the patient's hip against the stretcher, in order to perform the correct hip extension. As can be observed, the patient is correctly positioned and the therapist is also able to correctly carry out the precise movements, having both hands free for this purpose.

Figure 19:
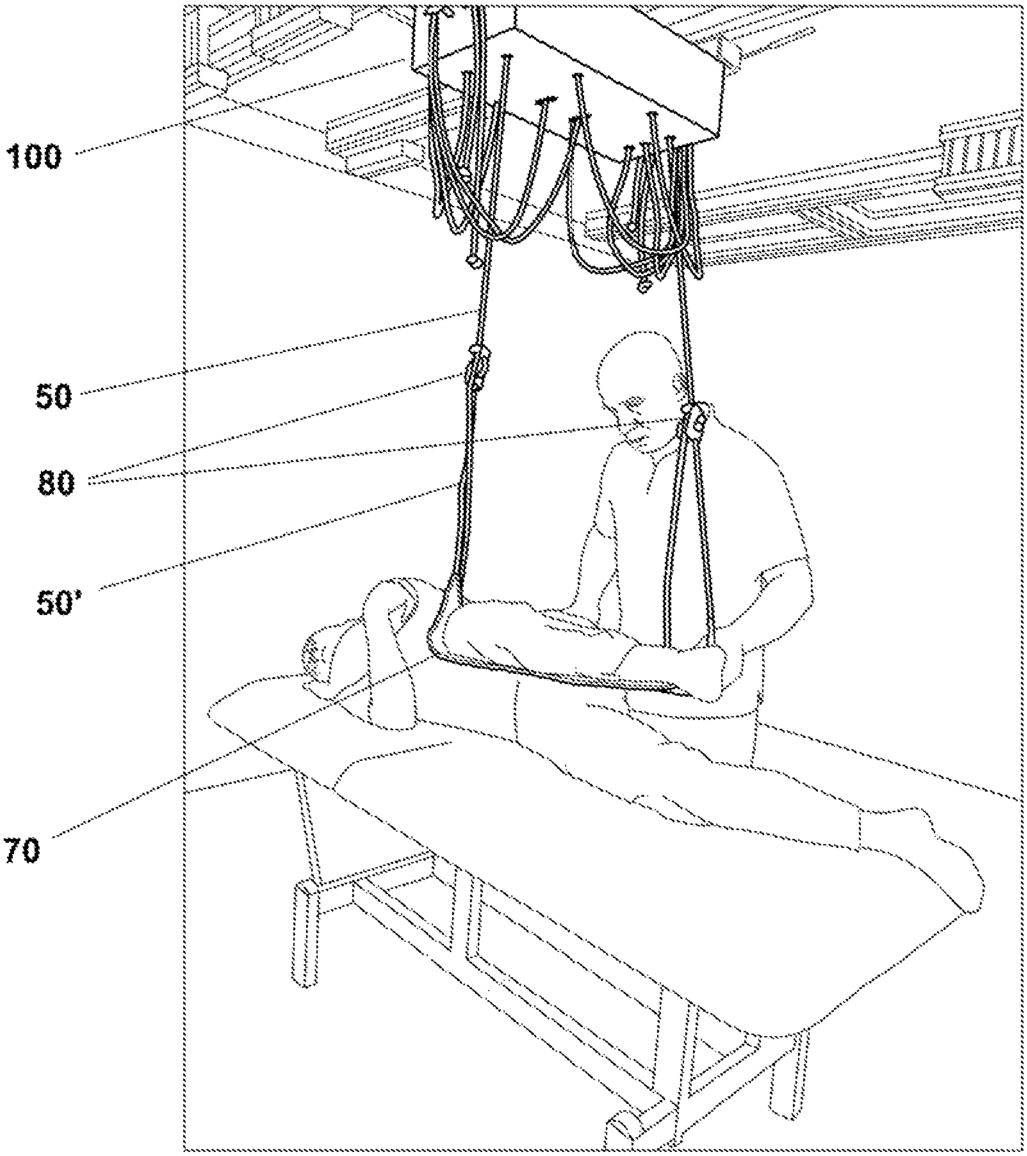
FIG. 19 shows one of the possible options for treatment of a patient with a therapeutic treatment kit in accordance with this invention, arranged so that a pelvis and/or hip support is placed under one of the patient's legs when flexed so that a hip flexion exercise can be performed.
Figure 20:
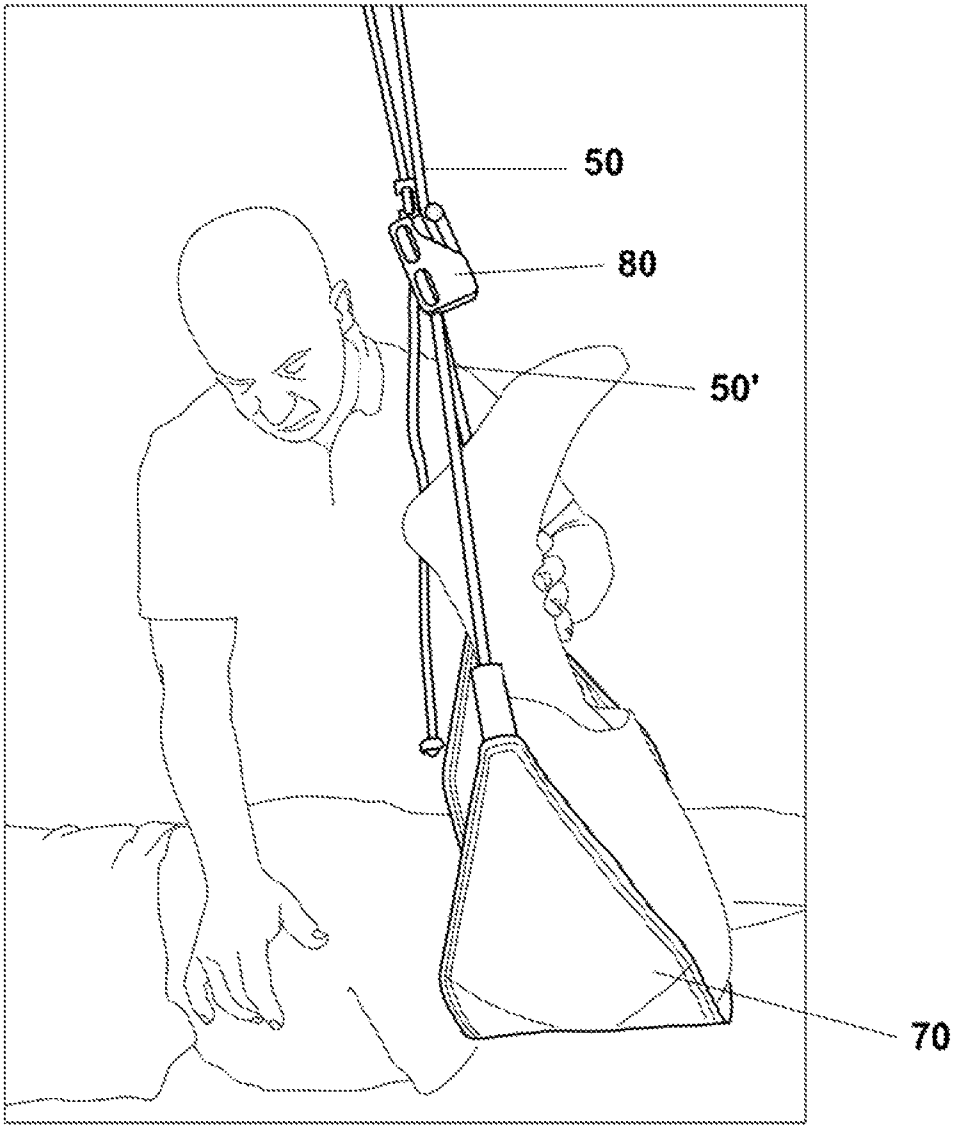
FIG. 20 shows one of the possible options for treatment of a patient with a therapeutic treatment kit in accordance with this invention, arranged so that a pelvis and/or hip support is placed under one of the patient's legs so that a hip mobilisation exercise can be performed.
Figure 21:
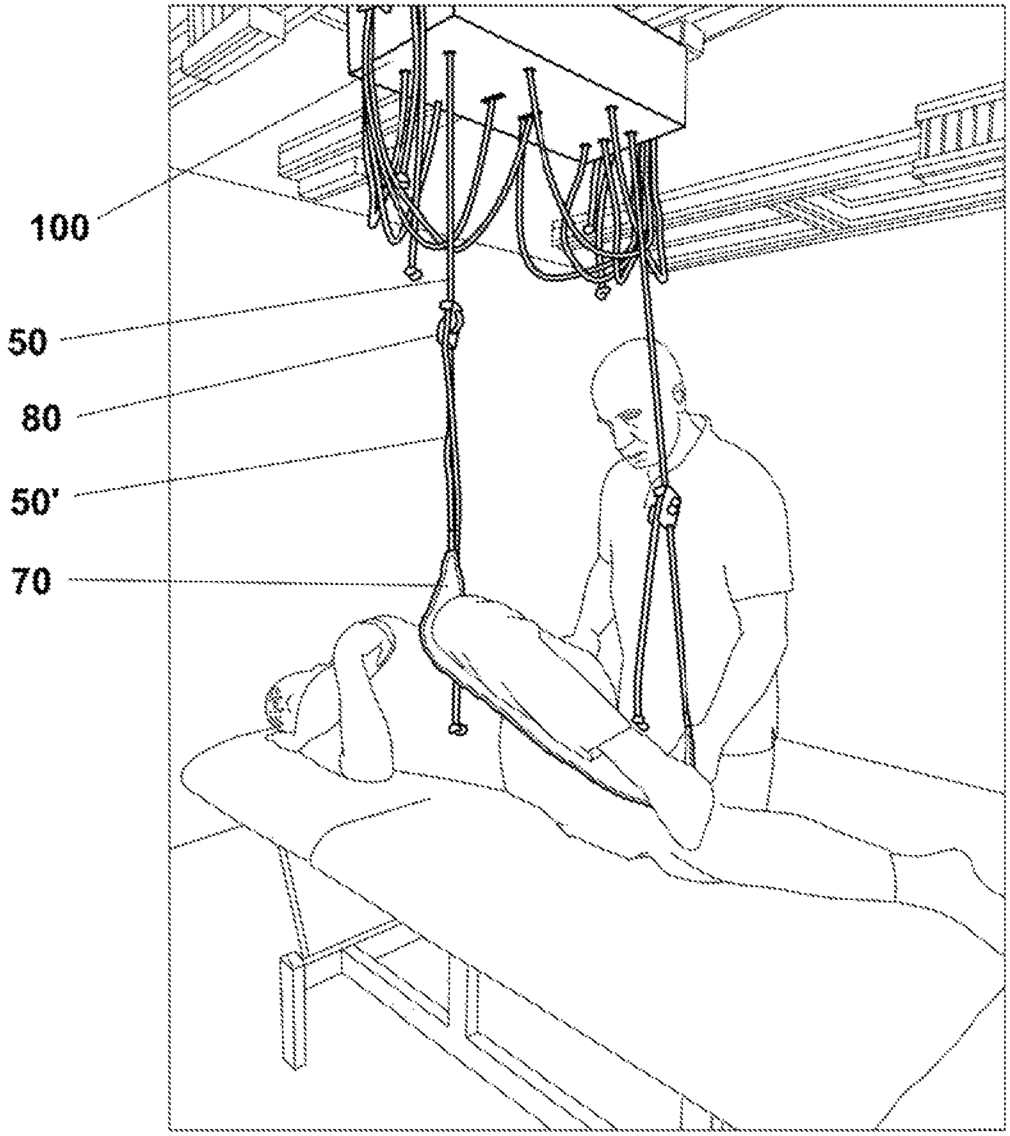
FIG. 21 shows one of the possible options for treatment of a patient with a therapeutic treatment kit in accordance with this invention, arranged so that a pelvis and/or hip support is placed under one of the patient's legs so that an external hip rotation exercise can be performed.
Figure 22:
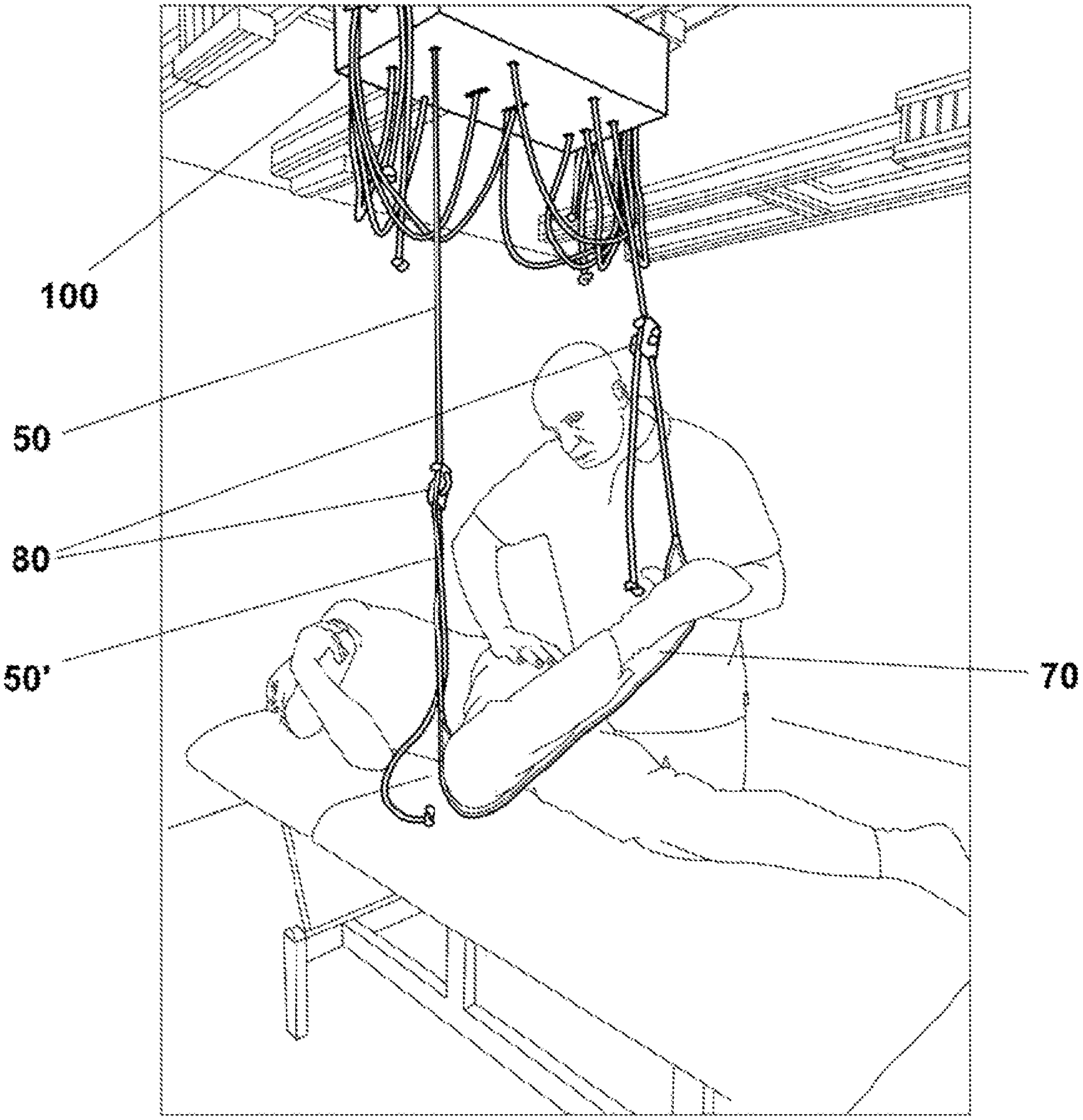
FIG. 22 shows one of the possible options for treatment of a patient with a therapeutic treatment kit in accordance with this invention, arranged so that a pelvis and/or hip support is placed under one of the patient's legs so that an internal hip rotation exercise can be performed.

FIG. 19 shows the configuration of the kit 100 to which the invention relates with the hip support 70 placed on the patient's hip and secured by a cord 50 for lower limbs at one end of the box 10, so that the patient's leg can be bent as shown in this Figure and the therapist can perform a hip flexion exercise. FIG. 20 shows the kit arranged in a similar way, so that the therapist bends the patient's leg and performs a mobilization of the patient's hip. FIG. 21 shows a similar configuration of the kit 100 to which the invention relates, enabling the therapist to gently and simply perform an external rotation of the patient's hip. FIG. 22 again shows a similar configuration to that of FIG. 21, giving the therapist the freedom to perform an internal rotation of the patient's hip, with both the patient and the therapist in tension-free positions.

Figure 23:
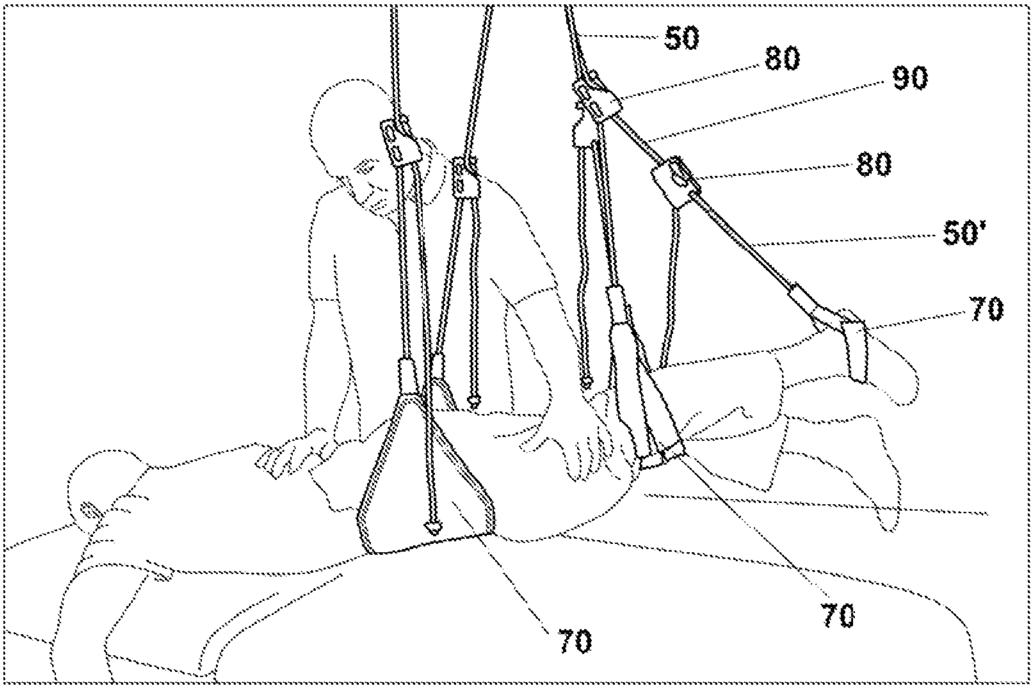
FIG. 23 shows one of the possible options for treatment of a patient with a therapeutic treatment kit in accordance with this invention, arranged so that a pelvis and/or hip support is placed under the patient's pelvis, with two lower limb supports and one foot support also being placed, so that a lumbar lateralisation exercise can be performed.

FIG. 23 shows the kit 100 to which the invention relates arranged so that the therapist can use it to perform a lumbar lateralisation with the patient on the stretcher. On the rear part of the box 10, the ends of the cord 50 firstly hold a foot support 70 placed on one of the patient's feet, and secondly a lower limb support 70 arranged to hold the leg of the patient's corresponding raised foot. Both supports are joined by a modulating structure 90 (as shown in FIG. 11) which Includes a short cord and two retaining elements 80, so that the said modulating structure 90 enables the joint coordinated action of two of the first and second supports and the cord 50 of the box 10 to which it is joined (the cord corresponding to the lower limbs).

Also, the kit is configured with a third support 70 for the pelvis and/or hip which raises the patient's hip and allows the therapist to pull towards one side of the patient's body in order to perform the said lumbar lateralisation. The patient lies comfortably face down on the stretcher, with their arms hanging over its sides. The therapist stands on one side of the stretcher, having both hands free to be able to move the patient laterally with one hand (the left hand in the figure) while at the same time holding their lumbar area in place with the other hand (the right hand in the figure), thus performing the necessary therapy comfortably and precisely.

Figure 24:
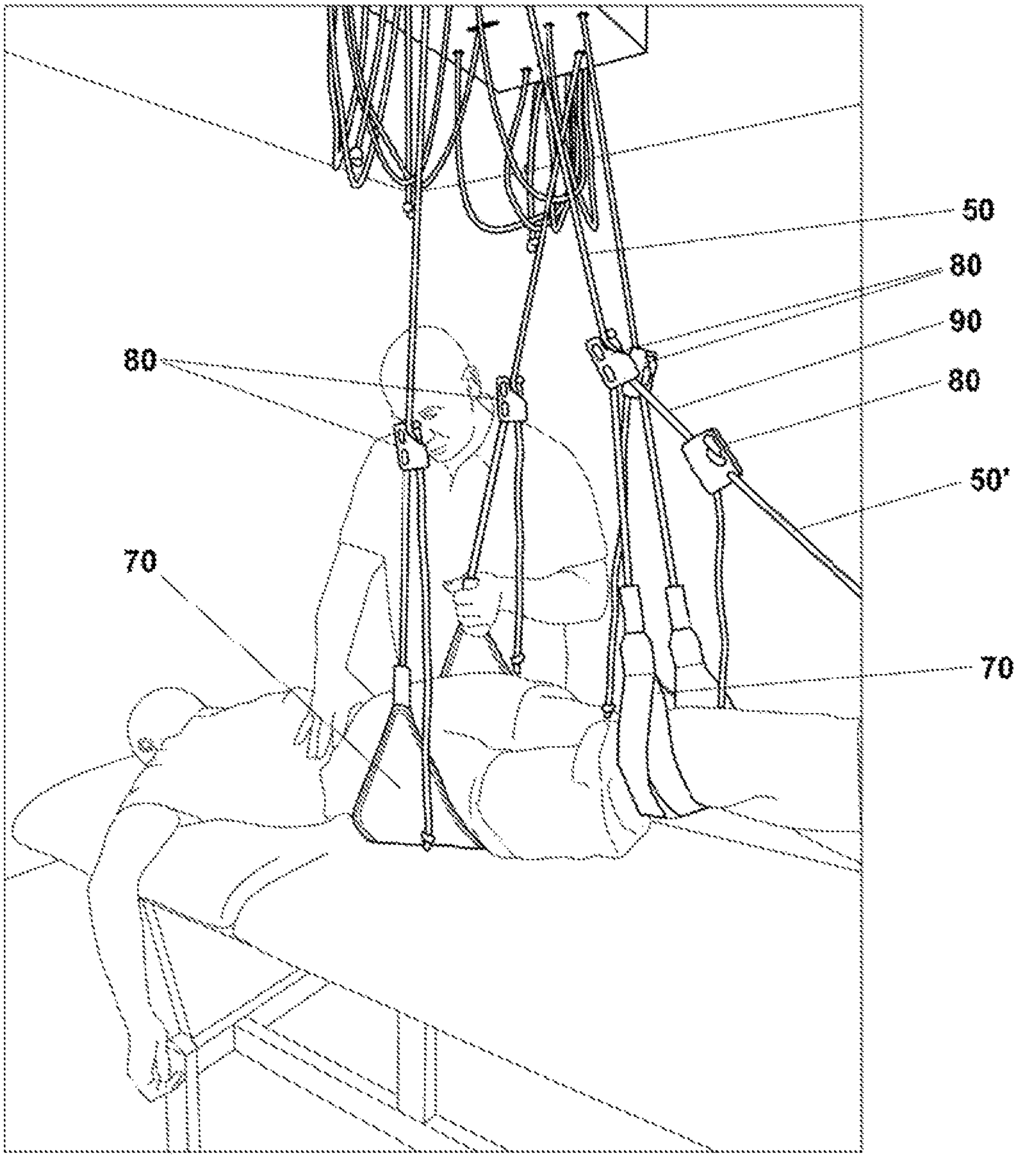
FIG. 24 shows one of the possible options for treatment of a patient with a therapeutic treatment kit in accordance with this invention, arranged so that a pelvis and/or hip support is placed under the patient's pelvis, with two lower limb supports and one foot support also being placed, so that a lumbar rotation exercise can be performed.

FIG. 24 shows the kit 100 to which the invention relates for performing a lumbar rotation on the patient. The configuration of the parts of the kit involved in this therapy is similar to that described in FIG. 23: one of the patient's feet is raised by a foot support and both their legs are also raised by a lower limb support 70. A third support 70 for the pelvis and/or hip raises the patient's hip and enables the therapist to tighten the corresponding cord and exert and maintain pressure on the patient's lumbar area, holding it in position and making a suitable lumbar rotation on it.

Figure 25:
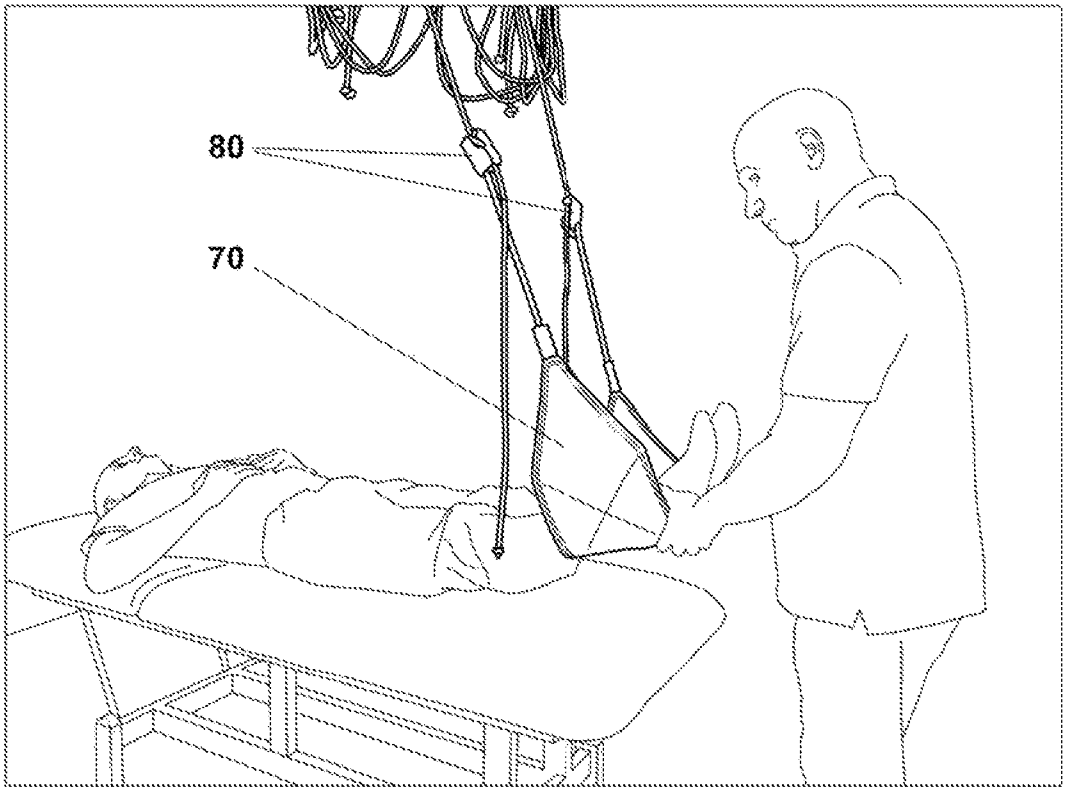
FIG. 25 shows one of the possible options for treatment of a patient with a therapeutic treatment kit in accordance with this invention, arranged so that a pelvis and/or hip support is placed on the lower part of the patient's legs so that a lumbar traction exercise can be performed.

FIG. 25 shows the kit 100 configured with a pelvis and/or hip support 70 placed on the lower part of the patient's legs, raising their feet: the therapist can then pull evenly on the patient's legs and perform a lumbar traction.

Figure 26:
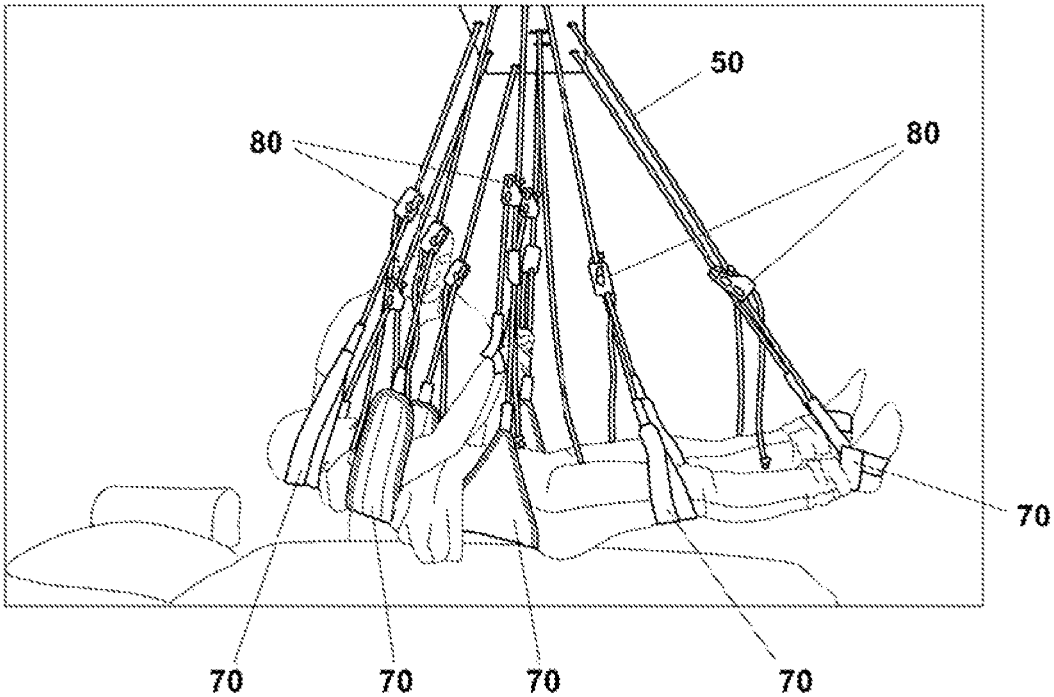
FIG. 26 shows another possible configuration of a therapeutic treatment kit in accordance with this invention, on which foot, lower limb, hip and/or pelvis, dorsal, hand and cervical supports are placed on the patient so that the patient's body can be totally lifted into the air to subsequently perform treatment as required.

FIG. 26 shows a configuration example of the kit 100 to which the invention relates whereby foot supports, lower limb (leg) supports, a pelvis and/or hip support, a dorsal support, hand supports and a cervical support have been placed so that the patient's body is totally and uniformly raised. As can be observed, in this case the patient is not touching the stretcher at any point.

FIG. 27 shows a configuration example of the kit 100 to which the invention relates whereby the patient is receiving cervicocranial therapy and is treated in sitting position in a conventional chair. As can be observed, cranial, upper limb and hand supports are being used for the patient.

Figure 28:
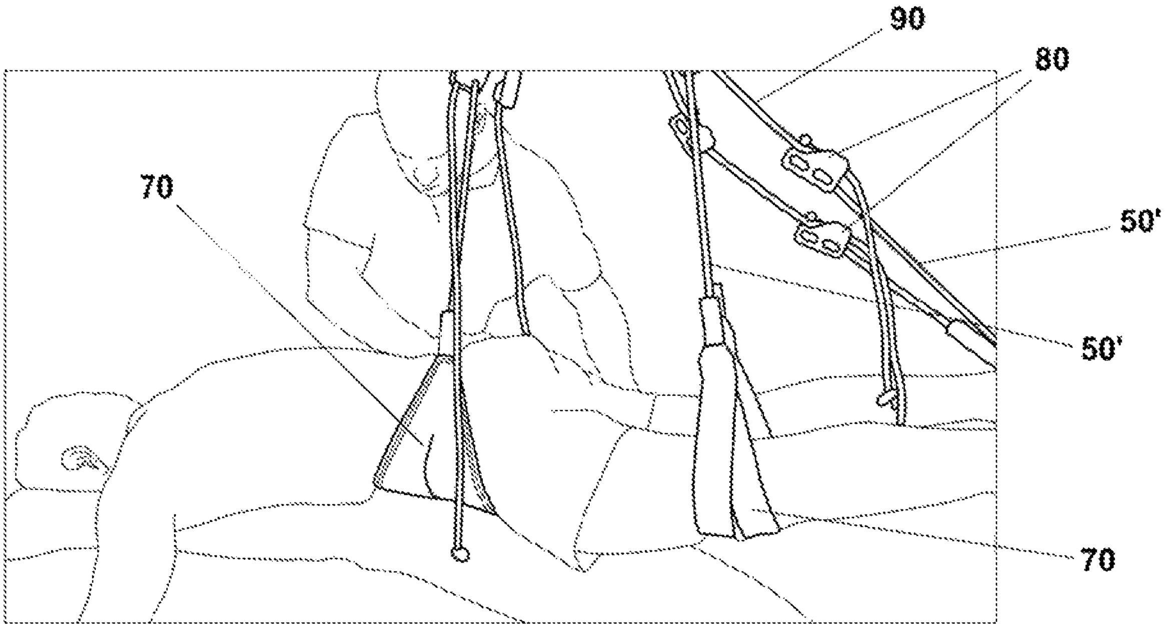
FIG. 28 shows an example of treatment using a therapeutic treatment kit in accordance with this invention in combination with an articulated stretcher with three sections for raising and/or lowering the cervical and/or lumbar area.

Although it does not form an integral part of the kit 100 to which the invention relates, it should be noted that even more ergonomic treatment could be achieved if instead of using a single stretcher as shown in FIGS. 17-26 an articulated stretcher with three sections able to raise and lower the cervical and/or lumbar area was used. These three-section stretchers that can that can raise and lower the cervical and/or lumbar area are comprised in the state of the art and may logically be used together with the kit to which the invention relates to obtain even greater advantages. FIG. 28 shows an example of treatment on a stretcher of this type whereby the therapist is working with the kit to which the invention relates and has lowered the lumbar part of the stretcher.

Figure 29:
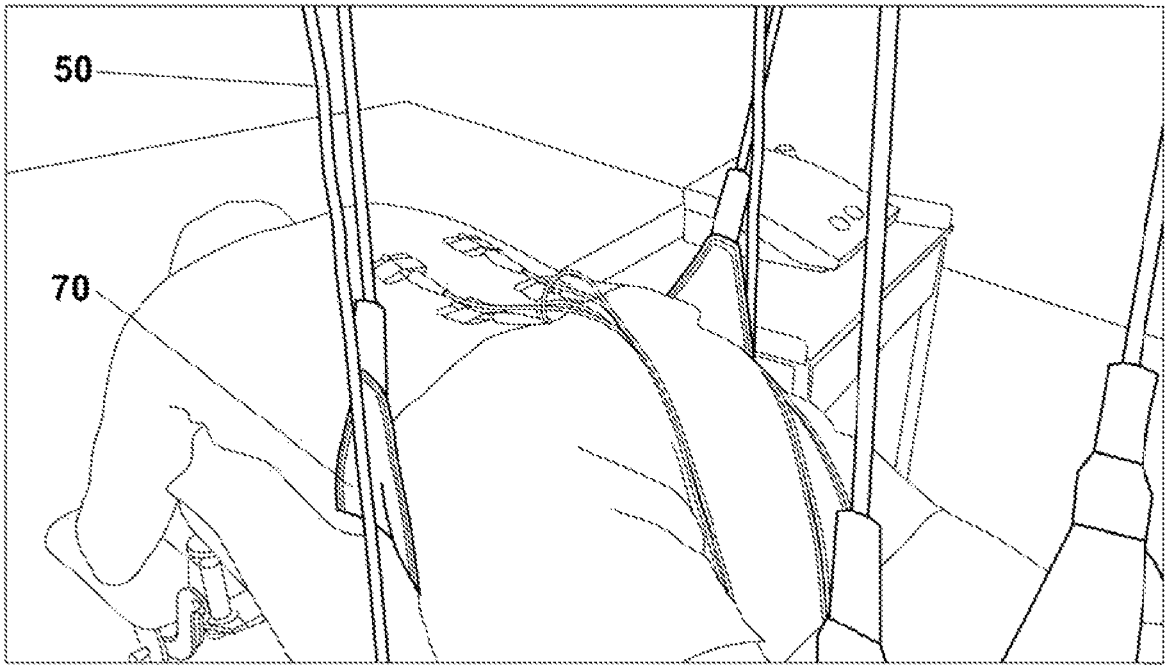
FIG. 29 shows an example of treatment using a therapeutic treatment kit in accordance with this invention in combination with an electrotherapy treatment device.

Any expert in the art would of course understand that the kit 100 to which the invention relates enables the patient to be suspended for treatment using any of the therapeutic and rehabilitation devices habitually used for physiotherapy treatment (e.g. electrotherapy, radiofrequency or magnetotherapy). The advantages for the therapist's work as described above are also applicable in these cases, in which application of the treatment using devices would be facilitated and improved. FIG. 29 shows an example of treatment using a therapeutic treatment kit in accordance with this invention in combination with an electrotherapy device. The Figure shows the electrotherapy device on a side table being used to apply electrodes which are placed on the patient's back as they lie face down.

It should also be noted that the kit to which the invention relates can be installed in any space with no limitations whatsoever. Thus, it is perfectly possible for it to be used in shower areas in centres such as hospitals or geriatric centres to facilitate showering for patients with reduced mobility, which could access it on a hospital stretcher.

Although this invention has been described referring to its preferable embodiments, other modifications and alterations may be made by an expert in the art with ordinary knowledge of the same, while maintaining the object of this invention, as defined in the attached claims.

| Numerical references | |
|---|---|
| Therapeutic treatment kit | 100 |
| Box | 10 |
| Handle(s) | 11 |
| Guides | 20 |
| Fixing element | 30 |
| Sliding structure | 110 |
| Support structure | 40 |
| Round holes | 41 |
| Elongated holes | 41' |
| Plates | 42 |
| Cords | 50 |
| Cords for supports | 50' |
| Elasticated cords | 55 |
| Pulleys | 60 |
| Supports, straps | 70 |
| Support, handles | 75 |
| Retainers | 80 |
| Locking devices | 85 |
| Modulators | 90 |

The invention claimed is:

1. Kit (100) for therapeutic treatment of a patient, configurable according to the said patient's therapeutic treatment requirements, comprising:

a box (10) joined by an articulated or fixed connection to a support structure (40) a sliding structure (110) connected to the support structure (40) enabling the box (10) to be moved to a position selected for the said patient's therapeutic treatment, a pair of rails or guides (20) along which the sliding structure is displaced (110);

one or more cords (50);

one or more supports (70), comprising one or two cords (50'), the ends of which are provided with means of connection to the cords (50);

characterised in that the box (10) comprises one or more pairs of pulleys (60) fixed to its interior, whose axes of rotation are separated by different distances according to the part of the body to be therapeutically treated wherein the underside of the box (10) comprises a number of holes (41 or 41') over which the cords (50) run;

a different cord (50) runs over each pair of pulleys (60), each end of the said cord (50) being connected to one end of a support (70), in such a way that:

each cord (50) can be moved and/or adjusted separately from the other cords (50), and pulling vertically in an upward or downward direction on one end of a cord (50) causes the other end of the said cord (50) to move in the opposite direction (upwards or downwards);

the means of connection between the cords (50) and the supports (70) are retaining elements (80) envisaged on the ends of the supports (70), these retaining elements (80) being configured so that they can be manually fixed in variable positions of the cords (50) of the box (10), thus enabling one or more parts of the patient's body to be raised and placed in the required positions for the therapeutic treatment.

2. Kit (100) for therapeutic treatment of a patient, configurable according to the said patient's therapeutic treatment requirements, according to claim 1 comprising the following pairs of pulleys (60):

a first pair of pulleys corresponding to the cervical area;

a second pair of pulleys corresponding to the dorsal, upper limb, shoulder, elbow and hand areas;

a third and a fourth pair of pulleys corresponding to the lumbar and pelvis areas;

a fifth pair of pulleys corresponding to the hip, knee and lower limb areas; and a sixth pair of pulleys corresponding to the foot area, wherein the separation between the axes of rotation of each of these pairs of pulleys (60) is adjusted to the dimensions of each of the aforementioned areas of the body in accordance with standard human body morphology.

3. Kit (100) for therapeutic treatment of a patient according to claim 1 wherein each of the retaining elements (80) is configured on the basis of a part of prismatic section with a rectangular base with rounded corners, one end of which is equipped with four holes serving to tie or fix the cords (50') of the supports (70) and the other end of which has a curved recess crossing the part transversally from a shorter side to a longer side, forming a groove through which the cords (50) of the kit 100 will run and be fixed, completed by a protuberance or stud on one of its sides.

4. Kit (100) for therapeutic treatment of a patient according to claim 1 wherein each of the retaining elements (80) incorporates a magnet.

5. Kit (100) for therapeutic treatment of a patient according to claim 1, which also comprises at least one modulating structure (90) consisting of a cord approximately 30 cm in length and two retaining elements (80), so that the said modulating structure (90) enables two of the cords (50) of the box (10) to which it is joined to be worked jointly and coordinately.

6. Kit (100) for therapeutic treatment of a patient according to claim 1 wherein the underside of the box (10) comprises a number of holes (41 or 41') over which the cords (50) run, characterised in that:

the holes (41 or 41') are spatially distributed to correspond to the one or more pairs of pulleys (60) located inside the box so that each pair of pulleys (60) has a corresponding pair of holes (41 or 41');

the ends of a cord (50) corresponding to a pair of pulleys (60) run vertically through their corresponding pair of holes (41 or 41');

the holes (41 or 41') are distributed to dimensionally adjust to the proportions of the human body in accordance with standard body morphology.

7. Kit (100) for therapeutic treatment of a patient according to claim 6, wherein the holes (41) are of circular section and have a diameter slightly larger than that of the cords (50), and wherein the holes (41') are of elongated section and internally incorporate a locking part (85) to lock or secure the cord (50) in a fixed position.

8. Kit (100) for therapeutic treatment of a patient according to claim 1, wherein the box (10) comprises an internal structure formed by several plates (42) equipped with their corresponding holes for holding the pulleys (60).

9. Kit (100) for therapeutic treatment of a patient according to claim 8, wherein the pulleys (60) are fixed to the internal structure formed by several plates (42) by a bolt that passes through the holes made in the plates (42) and is secured by a simple nut and pressure washer.

10. Kit (100) for therapeutic treatment of a patient according to claim 1 wherein the box (10) joined to the support structure (40) by an articulated connection can be partially disengaged and rotated 180°.

11. Kit (100) for therapeutic treatment of a patient according to claim 1 which also comprises at least one fixing element or brake (30) enabling the support structure (40) and the box (10) to be fixed in a certain position on the rails or guides (20).

* * * * *